United States Patent [19]
Fujisaki et al.

[11] Patent Number: 5,901,229
[45] Date of Patent: May 4, 1999

[54] ELECTRONIC CASH IMPLEMENTING METHOD USING A TRUSTEE

[75] Inventors: Eiichiro Fujisaki; Tatsuaki Okamoto, both of Yokosuka; Kazuo Ohta, Zushi, all of Japan

[73] Assignee: Nippon Telegraph and Telephone Corp., Tokyo, Japan

[21] Appl. No.: 08/744,856

[22] Filed: Nov. 4, 1996

[30] Foreign Application Priority Data

| Nov. 6, 1995 | [JP] | Japan | 7-287457 |
| Mar. 14, 1996 | [JP] | Japan | 8-057536 |
| Mar. 14, 1996 | [JP] | Japan | 8-057537 |

[51] Int. Cl.$^6$ ............................................. H04K 1/00
[52] U.S. Cl. ............................................. 380/30; 380/23
[58] Field of Search ............................ 380/30, 28, 23, 380/24, 25

[56] References Cited

U.S. PATENT DOCUMENTS

| 4,759,063 | 7/1988 | Chaum | 380/30 |
| 5,521,980 | 5/1996 | Brands | 380/30 |
| 5,604,805 | 2/1997 | Brands | 380/30 |

*Primary Examiner*—David Cain
*Attorney, Agent, or Firm*—Pollock, Vande Sande & Priddy

[57] ABSTRACT

In an electronic cash implementing method using a trustee, a user registers his identification information $ID_U$ and anonymous public key N with the trustee and receives a license (B,I). The user processes the license (B,I) by a public key corresponding to the amount to be issued and sends the processed information to a bank to have it attach a blind signature to the information so that the user obtain electronic cash C from the blind signature. The user transmits to a shop the information B,I,C,N and a digital signature that assures the divisional use of the electronic cash. The shop verifies the validity of the information B and C and accepts it as cash and sends a history H of communication with the user to the bank and receives a payment therefrom. The bank places all received communication histories under its supervision and makes a check to see if the amount x spent by the electronic cash C is in excess of its face value X, and if so, informs the trustee of the information N contained in the communication history. The trustee uses the information $ID_U$ thus received to specify the corresponding user identification information $ID_U$.

24 Claims, 20 Drawing Sheets

5,901,229

ELECTRONIC CASH IMPLEMENTING METHOD USING A TRUSTEE

BACKGROUND OF THE INVENTION

The present invention relates to a method for implementing electronic cash by exchanging digital information through utilization of an electronic cash system or smart cards and, more particularly, relates to an electronic cash implementing method which utilizes a trustee.

In the near future electronic cash will come into wider use and it is expected that people will use smart cards as electronic wallets storing electronic cash and make payments for their purchases by inserting the cards into computers of shops, or forward remittances via Internet or the like from home computers storing electronic cash just like bank accounts.

At any rate, it is desirable that electronic cash does not depend on any physical media or conditions so that information itself serves as electronic cash. With a method which guarantees electronic cash by physical means, the precondition for its security will greatly change with progress in fabrication techniques. Further, if always implemented in combination with a physical medium (a magnetic card or the like), electronic cash cannot be transferred over communication lines. The simplest way to transfer electronic cash as information is an electronic credit settlement (electronic credit or electronic check) system which utilizes an electronic signature scheme (described latter on). This method permits full electronification (computerization) of the entire system by using an electronic signature in place of a handwritten signature and enables information for settlements to be transferred through communication networks. However, this system cannot ensure user privacy; the same is true of prevailing credit card and check systems. That is, institutions which issue credit cards and handle users' settlement of accounts have easy access to their purchase histories, and shops can also easily get users' credit numbers and signatures.

A conventional system which permits transferring of electronic cash as information and protects user privacy is one that utilizes a blind signature scheme (described later on). This system is divided into two: (1) a system in which when receiving payment, the shop immediately transmits electronic cash to a bank for an on-line check, and (2) a system in which the shop makes a provisional check and afterward transmits electronic cash to the bank for normal checking. The check herein mentioned means that the shop inquires of the control center (a bank) if the customer's presented electronic cash has no monetary value because of double-spending and/or illicit use. In the system (1), since every shop needs to access the control center upon each receipt of payment, this system is not practical from the viewpoints of processing time or turnaround time (i.e. user's waiting time), communication costs, on-line processing costs at the control center and database maintenance costs, and so forth. Accordingly, the system (2) which permits off-line processing is preferable as an electronic cash system.

The following are conventional electronic cash systems which attach importance to user privacy and enable off-line processing.

(a) D. Chaum, A. Fiat and M. Naor, "Untraceable Electronic Cash," Advances in Cryptology-Crypto '88, Lecture Notes in Computer Science 403, pp.319–327, Springer-Verlag, Berlin (1988)

(b) T. Okamoto et al., "Disposable Zero-Knowledge Authentications and Their Applications to Untraceable Electronic Cash," Advances in Cryptology-Crypto '89, Lecture Notes in Computer science 435, pp. 481–496, Springer-Verlag, Berlin (1989)

(c) T. Okamoto et al., "Universal electronic Cash," Advances in Cryptology-Crypto '91, Lecture Notes in Computer Science 576, pp. 324–337, Springer-Verlag, Berlin (1991)

(d) T. Okamoto, "An Efficient Divisible Electronic Cash Scheme," Advances in Cryptology-Crypto '95, Springer-Verlag, Berlin (1995)

The electronic cash systems, typified by references (a) to (d), above have common problems left unsolved as listed below.

1. Without violation of the rules for using electronic cash (the rules for system operation), it would be utterly impossible to trace back the route or flow of electronic cash. This incurs the possibility of crimes like money-laundering becoming rampant.

2. In the event that secrets of the electronic cash issuing institution leak out, no effective measures can be taken to dispel social unrest. For example, if a kidnapper should wrest the secrets of the electronic cash issuing institution, this could mean major trouble, coupled with the above-mentioned untraceability of electronic cash.

3. The amount of information of electronic cash is too large to store on smart cards or the like.

SUMMARY OF THE INVENTION

It is therefore an object of the present invention to provide an electronic cash implementing method which ensures dividability and transferability of electronic cash and retains the double-usage or abuse detecting function as in the prior art and enables the route of electronic cash to be traced back to its origin and which when there is a fear of money laundering or similar crime, permits tracing of the flow of information only under the supervision or authorization of a reliable third party (a court, for instance) but normally protect the privacy of users and does not require the cut-and-choose method.

According to a first aspect of the present invention, when requested by a user to register his anonymous public information, a trustee 400 independent of a bank checks the user's name or identification information $ID_U$, then keeps the correspondence of the information N and the identification information $ID_U$ as a table, and generates and sends a signature corresponding to the anonymous public information N to the user. The user preserves the anonymous public information N and the signature of the trustee 400 as a license. The trustee 400 keeps the correspondence of the user's identification information $ID_U$ and the anonymous public information N in secrecy. Only when a reliable third party (a court, for instance) demands tracing of the flow of information, the trustee 400 make public the correspondence of the anonymous public information N and the user identification information $ID_U$.

According to another aspect of the invention, the electronic issuing procedure is divided into a license issuing procedure and an electronic cash issuing procedure, with a view to reducing the amount of information to be processed for the issuance of electronic cash (the license is supposed to be valid for a fixed period of time). Further, the amount of information to be processed for the issuance of the license is reduced by limiting user privacy necessary for issuing the license by the trustee 400.

According to another aspect of the invention, the user spends electronic cash C worth X in a desired amount for each purchase by generating a signature which guarantees the payment in an amount of x (where x≦X).

According to another aspect of the invention, when the user generates a signature which guarantees transferring an amount x (where x≦X), another user who obtains amount x can use it for a payment or for further transferring.

According to another aspect of the present invention, the trustee can be divided into a plurality of independent institutions to provide increased security for users.

DESCRIPTION OF THE PREFERRED EMBODIMENT

INTRODUCTION

Figure 1:
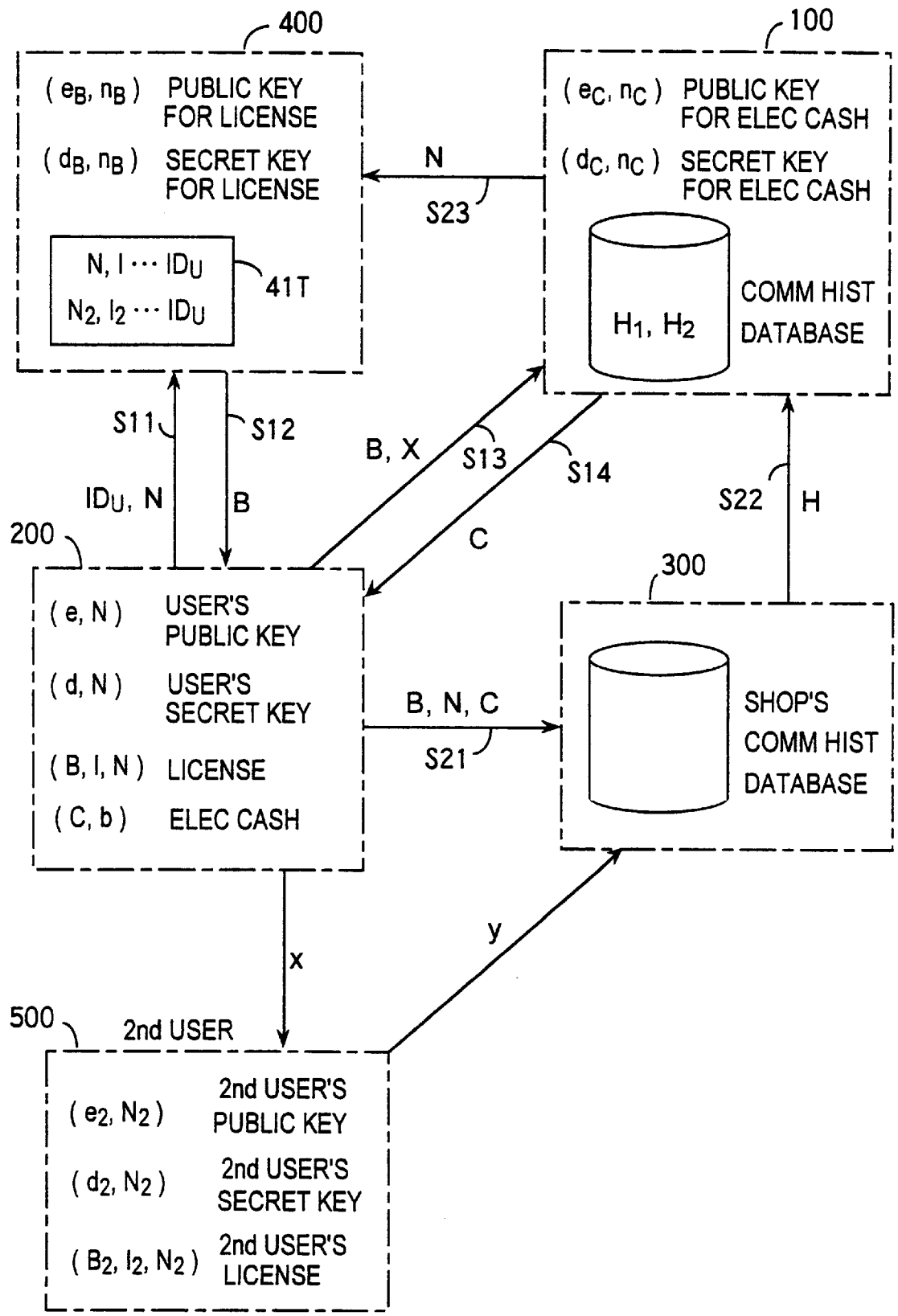
FIG. 1 is a block diagram illustrating the general configuration of an electronic cash implementing system embodying the present invention.

It is the most important feature of the present invention that a trustee independent of a bank issues licenses to individual users and makes and keeps a correspondence table of identification information $ID_{U1}$, $ID_{U2}$, . . . received from the users and their anonymous public key information $N_1$, $N_2$, . . . . Another important feature of the present invention resides in that the bank issues electronic cash C corresponding to a signature B of the trustee and its specified amount X. Hence, the bank cannot trace by itself the relationship between the user's identification information $ID_U$ and his anonymous public key N. The trustee cannot trace by itself the relationship between the user's identification information $ID_U$ and the electronic cash C, either. In the case of a transaction suspected of a crime like money-laundering, however, it is possible to specify the user who conducted transaction by making the bank present a history of transactions under a court order or the like, extracting the anonymous public key N from the history and obtaining the user's identification information $ID_U$ corresponding to the public key N through trustee's assistance.

The electronic cash system according to the present invention comprises four institutions with different purposes, such as a trustee, a user, a bank and a shop, and has seven phases of the payment, transfer, conversion and management of electronic cash and the detection of an attacker.

In the present invention, the trustee, the user and the bank make digital signatures. The trustee and the user can use arbitrary digital signature systems, whereas the bank can use a digital signature system which enables it to utilize a blind signature scheme.

Digital Signature

The digital signature (or electronic signature) mentioned herein is one that is attached by digital processing to desired digital information, and it is functionally equivalent to a signature or seal which is usually affixed to a document. In other words, the signature attached to certain electronic information means that the signer guarantees the contents of the electronic information. To hold a contract via an electronic mail system or to settle a WWW (World Wide Web) credit on Internet now coming into wide use is an example to which the digital signature system can be applied.

In general, the digital signature procedure has three phases, i.e. the registration, generation and verification of the signature. Further, the digital signature scheme includes information commonly called a secret key and a public key. A description will be given of the digital signature (hereinafter referred to as a signature) for use in the present invention.

Algorithms for the generation and verification of a signature and public parameters are made public in advance.

(1) Key Registration: Every signer has a secret key P and a public key N and registers the public key N in a public key register. The public key N needs to be unique to each signer. This is the registration of the key. The key need not always be registered, which will be described later on.

(2) Signature Generation: An electronic message m and the secret key P of the signer are input into the signature generation algorithm, whereby a signature s is generated. If the signature generation algorithm is regarded as a function, the signer's secret key is a parameter of this function and the message m represents the input value of the function.

(3) Signature Verification: The electronic message m, the signature s and the public key N are input into the signature verification algorithm, whereby OK/NG is output. This means it is verified that the signature s to the message m was put by a person having registered his public key N.

It must be noted here that since the public key N is registered in the public key register, anyone can verify the validity of the signature, but that only the signer who knows the secret key P can generate the signature.

There have been proposed many digital signature systems such as listed below.

(1) RSA scheme by Mr. Rivest et al. (R. L. Rivest, "A Method for Obtaining Digital Signatures and Public-Key Cryptosystems," Communications on ACM Vol. 2, pp. 120–126, 1978)

(2) Scheme described in T. Okamoto, "A Fast Signature Scheme Based on Congruential Polynomial Operations," IEEE Transactions on Information Theory, Vol. IT-36, No. 1, pp. 47–53 (January, 1990) (This will hereinafter be referred to as an "ESIGN" scheme.)

(3) Scheme described in A. Fiat and A. Shamir, "How to Prove Yourself: Practical Solutions to Identification and Signature Problems," in Advances in cryptology-CRYPT '86, Proceedings, LNCS 263, Springer-Verlag, Berlin, pp. 186–194 (1987) (This will hereinafter be referred to as an "FS" scheme.)

(4) Scheme described in S. Micali and A. Shamir, "An Improvement of the Fiat-Shamir Identification and Signature Scheme," Proceedings of Crypto '88, LNCS 403, Springer-verlag, pp. 244–247, 1990) (This will hereinafter be referred to as an "MS" scheme.)

(5) Scheme described in K. Ohta and T. Okamoto, "a Modification of the Fiat-Shamir Scheme," Proceedings of Crypto '88, LNCS 403, springer-Verlag, pp. 232–243 (1990) (This will hereinafter be referred to as an "OO" scheme.)

(6) Scheme described in T. Okamoto, "Provably secure and Practical Identification Schemes and corresponding Signature Schemes, to appear in the Proc. Of Crypto" '92 (This will hereinafter be referred to as an "Oka" scheme.)

(7) Scheme described in C. P. Schnorr, "Efficient signature generation by smart cards," Journal of Cryptology, vol. 4, No. 3, pp. 161–174 (1991) (This will hereinafter be referred to as a "Sch" scheme.)

The digital signature does not always require the public key register. There is also available a scheme which has the management center add the public key N instead of registering it. It is necessary, of course, that the public key of the management center be on some public key register.

Next, a description will be given of basic procedures of the "RSA," "ESIGN" and "OO" schemes typical of the digital signature system which trustee 400 and a user 200 in the present invention use.

(A) "RAS" Scheme (1) Key Registration: When subscribing to the electronic cash system, a signer A generates $d=e^{-1} \mod(p-1,q-1)$, $n=pq$ from two integers p and q, holds (d,n) as a secret key, registering (e,n) as a public key in a public key register.

(2) Signature Generation: The signer A calculates a signature $s(s,Z_n^*)$ from secret information (d,n) and a message m by the following equation through a hash function calculation (a one-way function calculation) and a modular multiplication $$s \equiv f(m)^d \mod n$$

and sends a pair of m and s to a verifier B. In the above, f(m) is a value ($f(m) \in Z_n$) generated by the hash function calculation. An example of the implementation or realization of the hash function is introduced in, for example, R. L. Rives, "Applying the RSA Digital Signature to Electronic Mail," IEEE computer, pp. 55–62, 1983.

(3) Signature Verification: The verifier B makes a check to see if the signature s is a valid signature to the message m of the signer A, by checking whether it satisfies the following verification equation. The verifier B generates f(m) by the hash function calculation from the message m and verifies the following equation by a modular multiplication and comparison:

$$S^e = f(m) (\mod n)$$

If the verification succeeds, the verifier B accepts the signed message as valid (OK) and, if not, rejects it as invalid (NG).

(B) "ESIGN" Scheme (1) Key Registration: When the signer A joins the system, he generates two integers p and q as a secret key and holds them in secrecy, generates a public key $n=p^2q$ and registers n in the public key register.

(2) Signature Generation: The following description will be given of the case where the signer A signs the message m. The signer A calculates the signature s ($s \in Z_n^*$) for f(m) (where $f(m) \in Z_n$) generated by the hash function calculation from the public information n and the message m and sends a pair of message m and signature s to the verifier B. In the first place, the signer A generates a random number $t \in Z_{pq}^*$ and calculates therefrom the following w by a modular rational operation, a subtraction, a division and a round-up operation:

$$w = \lceil \{f(m) - (t^k \mod n)\}/pq \rceil$$

Incidentally, $\lceil a \rceil$ means the minimum integral value greater than a (in this specification an operation executing this symbol will be called a "round-up operation). This is followed by a calculation of u which satisfies the following equation:

$$w \equiv kt^{k-1} u (\mod p)$$

To obtain this equation, the following calculation is made:

$$u = (kt^{k-1})^{-1} w \mod p$$

Finally, the signature s is calculated by the following operation.

$$s = t + upq$$

(3) Signature Verification: The verifier B verifies the validity of the signature s to the signer's message m by checking whether it satisfies the following verification equation. The verifier B generates f(m) by the hash function operation from the message m and verifies it by the following modular rational operation and comparison:

$$f(m) \leq s^k \mod n < f(m) + 2^{2\lceil n \rceil/3}$$

If the verification succeeds, the signed message is accepted as valid (OK) and, if not, rejected as invalid (NG).

(C) "OO" Scheme

Let public parameters be represented by n and L.

(1) Key Registration: When subscribing to the system, the signer A chooses an integer $x \in Z_n$, calculates $h=x^L \mod n$, holds x as a secret key and registers h as a public key on the public key register.

(2) Signature Generation: The signer A generates a random number $r \in Z_n$, obtains $$a = r^L \bmod n$$

by a modular multiplication and a modular exponential calculation, obtains $$c = f(m\|a)$$

by the hash function operation from the message m, obtains $$s = rx^c \bmod n$$

and sends (m,a,s) to a verifier B.

(3) Signature Verification: The verifier B checks the validity of the signature (a,s) to the signer's message m by checking whether it satisfies the following verification equation:

$$s^L \equiv ah^{f(m\|a)} (\bmod n)$$

If the verification succeeds, the verifier B accepts the signed message as valid (OK) and, if not, rejects it as invalid (NG).

Blind Signature

In such digital signature systems as described above, it may sometimes be possible to have the signer add his signature to the message m while keeping its contents secret. The signature thus obtained from the signer is called a blind signature. Combined with an electronic cash system or the like, this technique plays an important role of protecting users' privacy. The present invention introduces a blind signature protocol in the withdrawal of electronic cash from a bank. A general description will be given of the blind signature.

A person B who requests the blind signature generates a blind message m' from the message m by blind signature preprocessing. The signer A calculates a provisional signature s' corresponding to the blind message m' by using the secret key. The requesting person B computes the true signal s corresponding to the original message m from the provisional signature s' by blind signature postprocessing. The signer A attaches the provisional signature to the message m with no knowledge of its contents, but the signature s derived from the provisional signature s' is identical with the true signature of the signer A; hence, the verifier can verify the validity of the signature affixed to the message m, by using the public key of the signer A.

A blind signature system based on the RSA scheme is described in D. Chaum, "Security without Identification: Transaction Systems to Make Big Brother Obsolete," Comm. Of the ACM, 28, 10, pp. 1030–1044 (1985), and a blind signature system based on zero-knowledge interactive proofs is disclosed in T. Okamoto et al., "Diversible Zero-Knowledge Interactive Proofs and Commutative Random Self-Reducible," The Proc. Of Eurocrypt '89 (1989). The former system permits the implementation of the blind signature in the [RSA] scheme and the latter system in the [FS], [MS], [OO] and [Oka] schemes.

(A) Blind Signature by [RSA] Scheme

The requesting person B generates a random number r by a random generator, then calculates Z by hash operation, modular exponential calculation and modular multiplication from the random number r and the message m, and sends it to the true signer A.

$$Z = f(m)r^e \bmod n$$

The signer A uses the secret key (d,n) to obtain $$\Theta = Z^d \bmod n$$

by modular exponential calculation and sends it to the requesting person B.

The requesting person B can calculate the true signature s by using the public key (e,n), a modular inverse calculator and a modular multiplier.

$$s = \Theta/r \bmod n$$

where $s = f(m)^d \bmod n$ and s is the true signature to the message m.

(B) Blind Signature Based on Zero-knowledge Interactive Proofs by [OO] Scheme

To comply with the request from the requesting person B, the signer A generates a random number r, then obtains $$a' = r^L \bmod n$$

by modular exponential calculation and sends it to the requesting person B

The requesting person B generates random numbers r' and b and obtains $$a = a'r'^L h^b \bmod n$$

by modular exponential calculation and modular multiplication. Further, the requesting person B calculates $$c = f(m\|a) \bmod n$$

by hash operation and calculates $$c' = c + b \bmod L$$

by addition, subtraction and modular operation and sends it to the signer A.

The signer A obtains $$s' = rx^{c'} \bmod n$$

by modular exponential calculation and modular multiplication from the public key h and the secret key x and sends it to the requesting person B.

The requesting person B computes d by addition, subtraction and modular multiplication which satisfies the following equation $$c' = c + b + dL$$

and calculates $$s = s'r'h^{-d} \bmod n$$

by modular exponential calculation and modular multiplication. Here, (a,s) becomes identical with the true signature added to the message m.

First Embodiment

FIG. 1 illustrates a basic configuration of a first embodiment of such an electronic cash system as described above. In this embodiment, electronic cash is divisible and transferable. The electronic cash system of FIG. 1 comprises a trustee 400, a bank 100, a user 200, a shop 300 and another user 500, which are interconnected via communication lines but may also be connected via a smart card or the like on which information can be recorded.

A description will be given first, with respect to FIG. 1, of the basic principle of the present invention. The most important feature of the present invention resides in that the trustee 400, independent of the bank 100 issues a license B to each user 200, and compiles and maintains a correspondence table of identification information IDU received from the users 200 and their anonymous public information N or pseudonyms I, whereas the bank 100 issues to the user 200, who presents the license B and an amount of money X, electronic cash C corresponding to the specified amount X. Accordingly, the bank 100 cannot learn the relationship between the identification information $ID_U$ of the user 200 and his public information N. The trustee 400 cannot learn the relationship between the user's identification information $ID_U$ and the electronic cash C, either. As described later on, however, in the case of tracing a transaction (payment) suspected of a crime like money-laundering, under the authorization of a court it is possible to specify the user 200 related to the transaction by making the bank 100 present the anonymous public information N in a communication history, i.e., payment history H concerning the transaction and the trustee 400 present the user's identification information $ID_U$ corresponding to the anonymous public information N.

A basic procedure from the issuance of the license to the issuance of electronic cash is as follows.

Step S11: The user 200 sends his identification information $ID_U$ and anonymous public information N to the trustee 400.

Step S12: The trustee 400 keeps the correspondence between the user's identification information $ID_U$ and anonymous public information N as a table 41T in secret, then generates a signature B of the trustee 400 for the anonymous public information N and sends it to the user 200 (issuance of license).

Step S13: The user 200 stores the signature B of the trustee 400 as the license, then presents the license B and some amount of money X to the bank 100 and requests it to issue the electronic cash c worth the amount X.

Step S14: The bank 100 issues the electronic cash C related to the license B and worth the amount X to the user 200 (issuance of electronic cash).

Next, a basic procedure for the use of electronic cash will be described.

Step S21: The user 200 presents the anonymous public information N, the license B and the electronic cash C to the shop 300. Further, the user 200 generates a signature S which assures the payment of the amount of used money x (where x≦X) by using the anonymous public information N and sends the signature S to the shop 300, thereby making payment (payment of electronic cash).

Step S22: The shop 300 settles the account concerned by sending payment history information H to the bank 100 and receives the amount of money corresponding to the amount x (conversion of electronic cash).

Step S23: The bank 100 checks whether the sum total of payment by the electronic cash C is within the limit X (management of electronic cash), and if the total exceeds the limit X, the bank 100 will extract at least the anonymous public information N of a history of payment by the electronic cash c and send it to the trustee 400.

Step S24: When receiving instructions from an official third party, the bank 100 and the trustee 400 respectively retrieve the identification information and anonymous public key of the user designated by the official third party from a communication history placed under the control of the bank 100 and the correspondence table held by the trustee 400, and they send the retrieved information to the official third party.

Based on the anonymous public information N received, the trustee 400 can make public the correspondence between the user 200 in the correspondence table 41T and the anonymous public information N, but an ordinary settlement of accounts with the bank can be made without disclosing the user's name.

With the configuration of the basic principle of the present invention shown in FIG. 1, the trustee 400 generates the signature B in step S12, then the bank 100 generates the electronic cash C signed by the bank 100 in the blind manner in step S14, and the user 200 generates the digital signature S that assures the shop 300 of the payment of the amount of money x in step S21. Since these digital signature procedures (including the blind signature) conclude between the trustee 400 and the user 200, between the bank 100 and the user 200, and between the user 200 and the shop 300, respectively, digital signature systems of any types can be employed.

Next, a specific operative example of the present invention will be described.

Preliminary Procedure

In the electronic cash system of the first embodiment, the user of electronic cash first has a license issued by an institution called a trustee. The bank (which issues and settles the electronic cash and may be any type of financial institution, in practice) complies with the user's request to issue electronic cash worth a certain amount of money to the user. The user uses the electronic cash to make payments to shops until the face value of the electronic cash is reached. Finally, each shop settles its account with the bank for each payment from the user.

While the trustee 400, the user 200 and the bank 100 can use any of the above-described electronic signature algorithms, the following description will be given on the assumption that they all use the RSA signature algorithm and that the pairs of secret keys and public keys for their use are $(d_B,n_B)$ and $(e_B,n_B)$ for a the trustee (for license), $(d_C,n_C)$ and $(e_C,n_C)$ for the bank (for electronic cash) and (d,N) and (e,N) for the user. The public key N of the user 200 is anonymous public information.

The signature of the trustee 400 and the signature of the bank 100 are used to check the validity of the license and electronic cash, respectively. In users' signatures, e in the public key may be made common, but the anonymous public information which is a composite number is defined as the product of two secret primes for each user.

When it is desired that the face value of the electronic cash to be issued by the bank 100 be divided into a plurality of amounts of money, a pair of secret and public keys $(d_C,n_C)$ and $(e_C,n_C)$ corresponding to each amount of money are prepared and laid open to the public, together with the amount of money $(e_C,n_C)$. Furthermore, one-way functions (hash functions) g and h for signature use are also defined and made public in advance.

Procedure for Issuing License

Figure 2:
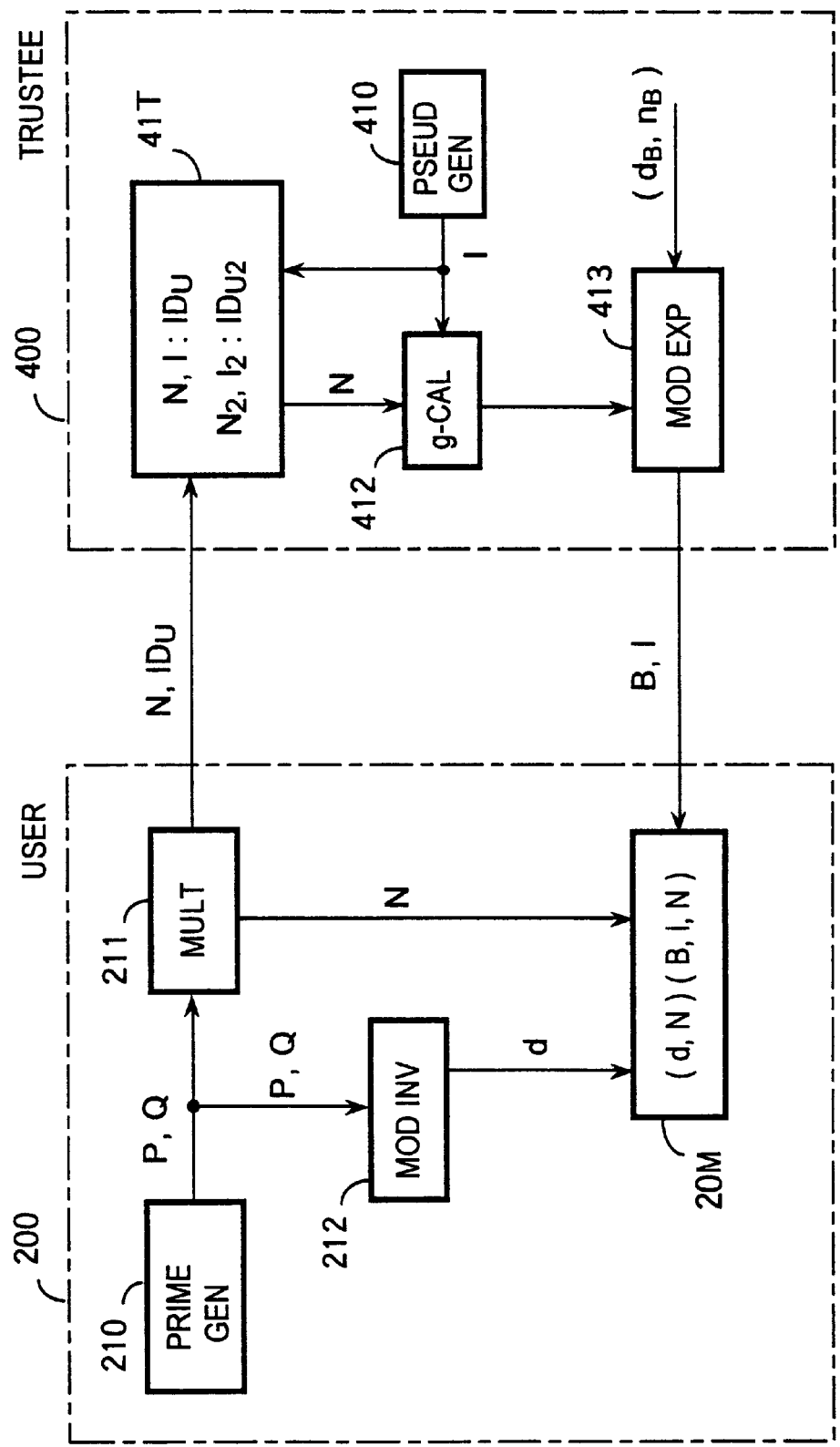
FIG. 2 is a block diagram showing a license issuance processing which is carried out between a user and a trustee in FIG. 1 according to a first embodiment of the present invention.

FIG. 2 is explanatory of the procedure for the user 200 to have the license issued by the trustee 400. Each user performs this procedure only once for the registration of the composite number N.

Step 1: The user 200 generates two large prime numbers P and Q by a prime generator 210 and calculates the composite number N (N=P×Q) by a multiplier 211, which is used as the anonymous public information N. Another public key e of the RSA scheme is common to all users and is set to a value 3, for instance. Further, the user 200 calculates $$d=e^{-1} \bmod LCM(P-1, Q-1) \tag{1}$$

from e, P and Q by a modular inverse calculator 212 and stores d and N in a memory 20M.

Step 2: The user 200 transmits the composite number N to the trustee 400 together with the user identification information $ID_U$.

Step 3: The trustee 400 verifies the identity of the user 200 by some method. When the verification succeeds, the trustee 400 generates, as a pseudonym I, information such as the term of validity of the license as a pseudonym I by a pseudonym generator 410, then writes the correspondence of the identification information $ID_U$ of the user 200 with the pseudonym I and the public key N into the correspondence table 41T and keeps it in secret.

Step 4: The trustee 400 performs the following signature calculation by a g-calculator 412 and a modular exponential calculator 413:

$$B = g(N\|I)^{d_B} \bmod n_B \quad (2)$$

The trustee 400 transmits the signature B and the pseudonym I to the user 200.

Step 5: The user 200 stores the data B and I received from the trustee 400 and the anonymous public information N, as a license (B,I,N) in the memory 20M.

In the case of exchanging the above-mentioned information over a communication line, it is preferable to encipher individual information.

Procedure for Issuing Electronic Cash

Figure 3:
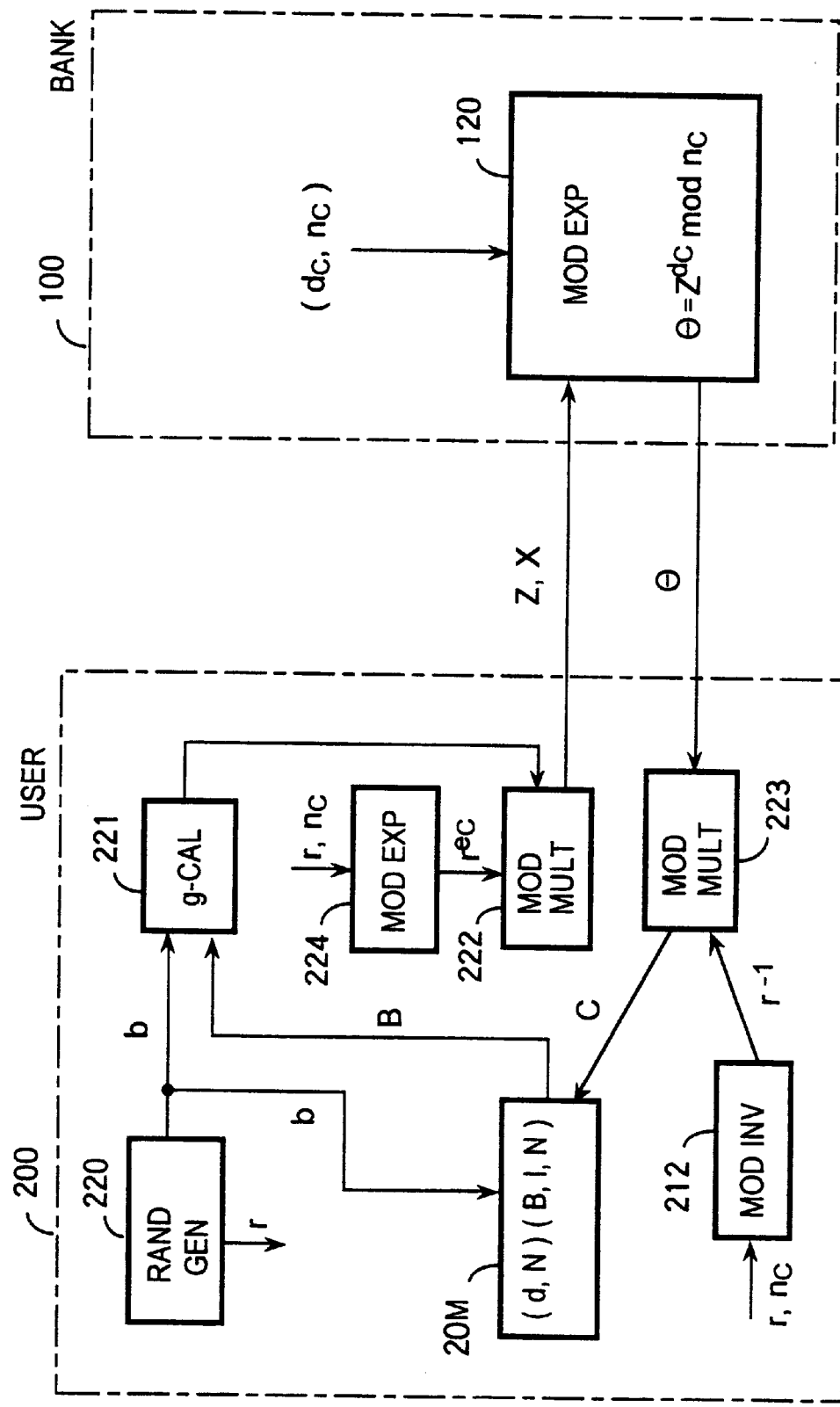
FIG. 3 is a block diagram showing an electronic cash issuance processing between the user and a bank in FIG. 1.

Next, a description will be given, with reference to FIG. 3, of the procedure for the user 200 to get the electronic cash C issued from the bank 100. In this instance, $(e_C, n_C)$ is a public key for the bank's digital signature which corresponds to the face value X (10,000 yen, for instance) of the electronic cash specified by the user 200.

Step 1: The user 200 generates a random value b by a random number generator 220 and stores it in the memory 20M, while at the same time the user 200 calculates $g(B\|b)$ by a g-calculator 221 from the random value b and the license (B,I,N) read out of the memory 20M. Moreover, the user 200 performs blind signature preprocessing of the following equation by a modular exponential calculator 224 and a modular multiplier 222 through the use of the public key $(e_C, n_C)$ corresponding to a limited amount of money available A which the user 200 wishes to get (face value information: 10,000 yen, for instance) and a random value r generated by the random generator 220.

$$Z = g(B\|b)r^{e_C} \bmod n_C \quad (3)$$

This result Z is transmitted to the bank 100, together with the face value information of the electronic cash, i.e. the limited amount of money available X.

Step 2: The bank 100 responds to the information Z received from the user 200 to generate a provisional signature by the following calculation, using the secret key $(d_C, n_C)$ corresponding to the face value of the electronic cash and a modular exponential calculator 120:

$$\Theta = Z^{d_C} \bmod n_C \quad (4)$$

The provisional signature $\Theta$ is sent to the user 200. At the same time, the bank 100 withdraws the amount of money concerned X from the account of the user 200, or receives the corresponding amount of money from the user 200 by some other means.

Step 3: The user 200 performs blind signature postprocessing for the public key $(e_C, n_C)$ of the specified amount of money and the received information $\Theta$ by the following equation with a modular inverse calculator 212 and a modular multiplier 223, thereby obtaining the electronic cash C of the specified face value:

$$C = \Theta/r \bmod n_C \quad (5)$$

It must be noted here that $C = g(B\|b)^{d_C} \bmod n_C$.

Payment by Electronic Cash

Figure 4:
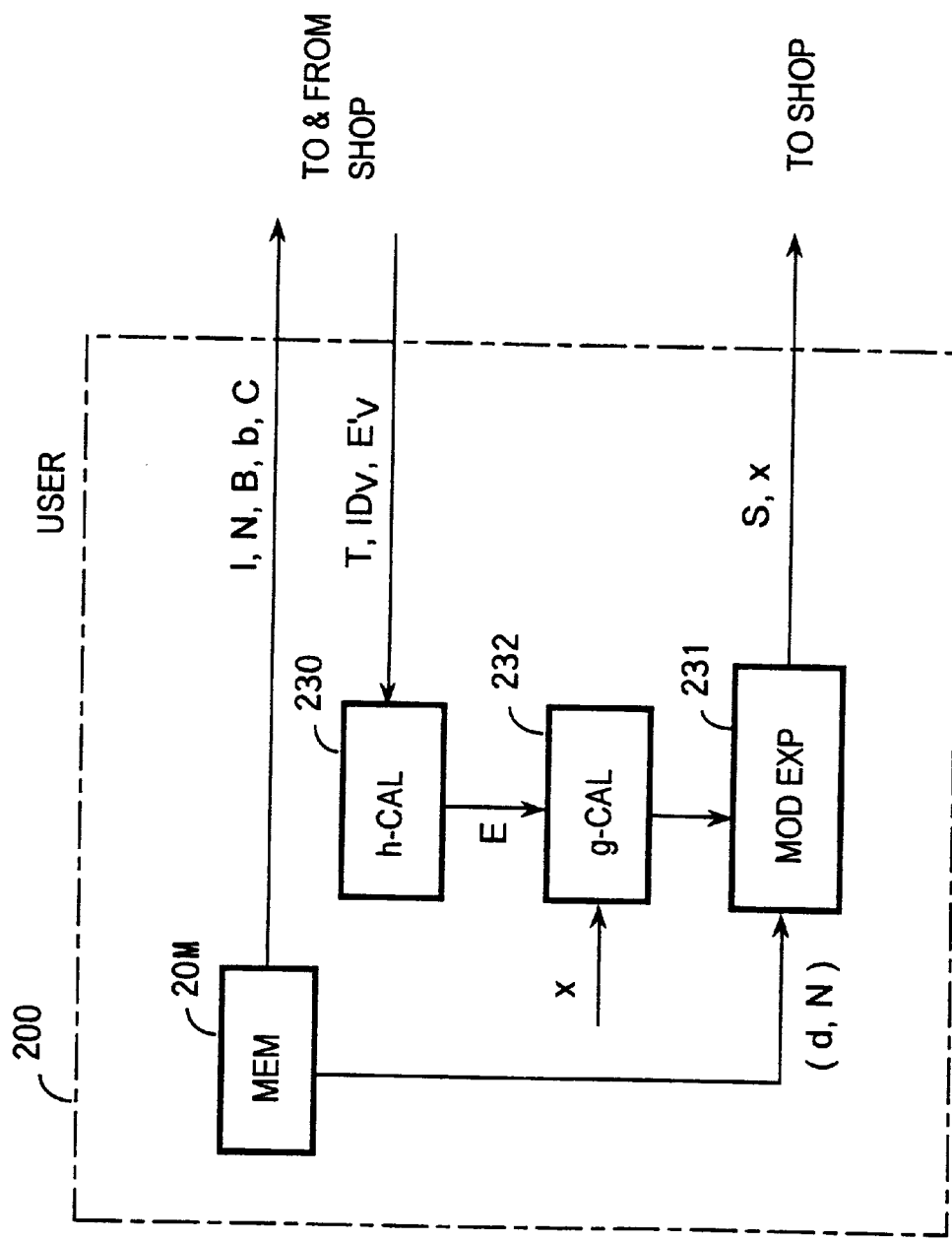
FIG. 4 is a block diagram showing processing by the user for payment by electronic cash to a shop in FIG. 1.

Now, a description will be given, with reference to FIGS. 4 and 5, of the procedure which the user 200 follows to make a payment to the shop 300 by the electronic cash c issued from the bank 100.

Step 1: The user 200 sends {I,B,b,C} read out of the memory 20M to the shop 300.

Step 2: The shop 300 verifies the validity of the signature B to (I,N), i.e. the validity of the license, by checking whether B satisfies the following equation, through the use of a g-calculator 310a, a modular exponential calculator 310b and a comparator 310c:

$$B^{e_B} \equiv g(N\|I)(\bmod n_B) \quad (6)$$

Furthermore, the shop 300 verifies the validity of the signature (B,b) to the electronic cash C, i.e. the validity of the electronic cash C, by checking whether C satisfies the following equation, through the use of a g-calculator 311a, a modular exponential calculator 311b and a comparator 311c:

$$C^{e_C} \equiv g(B\|b)(\bmod n_C) \quad (7)$$

If either one of the signatures is found invalid, no further processing will be continued.

Step 3: When both signatures are found valid, the shop 300 generates a random value $E_V'$ by a random generator 312 serving as an inquiry or challenge generator, then sends it to the user 200 together with an identifier $ID_V$ of the shop 300 and a time stamp T and calculates $E_V = h(ID_V\|T\|E_V')$ by an h-calculator 316.

Step 4: The user 200 determines that he spends the electronic cash C in the amount x, and signs the amount x and the information received from the shop 300 by the following equation with an h-calculator 230, a g-calculator 232 and a modular exponential calculator 231:

$$S = g(x\|h(ID_V\|T\|E_V'))^d \bmod N \quad (8)$$

The signature S and the amount of money x are sent to the shop 300 as a response to its inquiry $E_V'$.

Step 5: Based on the public key $(e_C, n_C)$ having passed the checking of the validity of the electronic cash C, the shop 300 detects the maximum available amount X approved for the electronic cash C from a value table, then makes a check to see if the amount x does not exceeds the approved amount X, and if so, the shop 300 halts the subsequent processing.

If the amount x is smaller than the approved amount X, the shop 300 verifies the validity of the signature S by the following equation through the use of a g-calculator 317, a modular exponential calculator 314 and a comparator 315:

$$S^e \equiv g(x\|E_V)(\bmod N) \quad (9)$$

When this verification succeeds, the shop 300 regards the user's payment in the amount concerned as valid and receives it.

Settlement of Accounts

Figure 6:
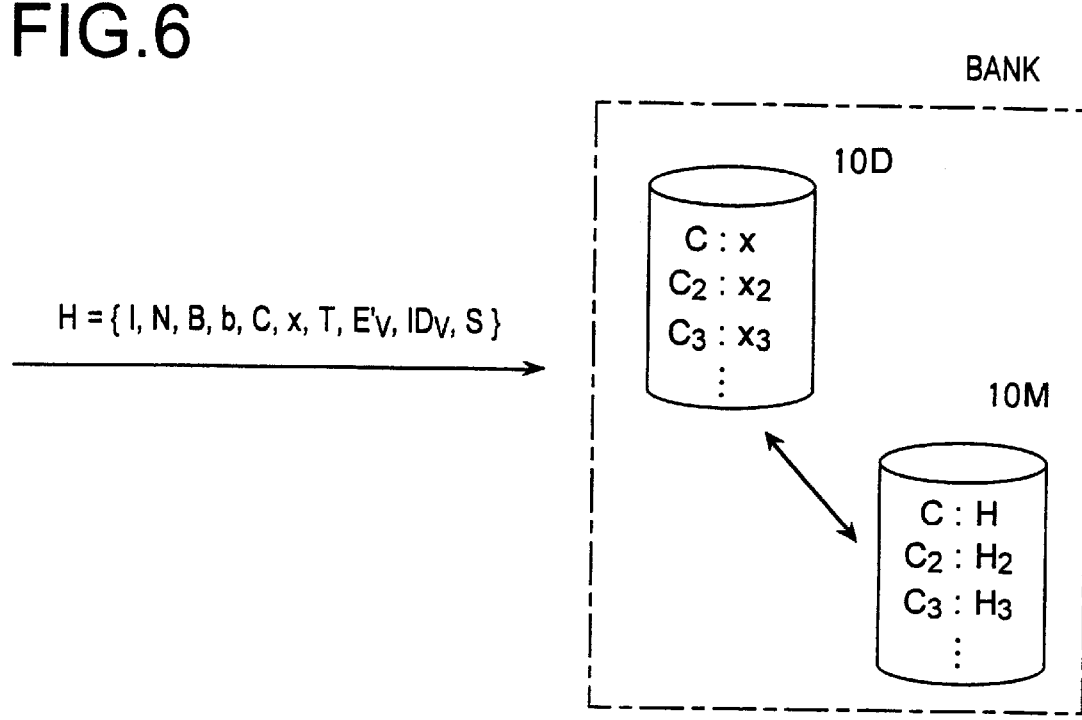
FIG. 6 is a block diagram showing processing for settlement of accounts between the shop and the bank in FIG. 1.

Turning now to FIG. 6, the settlement of accounts between the shop 300 and the bank 100 will be described below. The shop 300 presents to the bank 100 a history H of communications exchanged between the shop 400 and the user 200 when the electronic cash C was used, that is, {I,N,B,b,c} from the user 200 to the shop 300, {$ID_V$,T,$E_V'$} from the shop 300 to the user 200 and x and S sent from the user 200. The bank 100 verifies the validity of the communication history H; namely, as is the case with the verification conducted for the payment by the electronic cash, the bank 100 makes the checks by Eqs. (6), (7) and (9). When the user's license B, the electronic cash and the user's signature S are all found valid, the bank 100 stores the communication history H and pays the amount of money concerned x into the account of the shop 300 or pays the amount x to the shop 300 by some other means.

The bank 100 places the communication history H under its control to prevent the electronic cash C from being spent in excess of the maximum approved amount X. For example, only the electronic cash C and the amount x are stored in a first database 10D, and provision is made so that the first database and a second database 10M in which the history of payment H by the electronic cash C is stored can be retrieved using the information C as a key. It can be checked by retrieving the first database 10D whether the total amount of money paid by the electronic cash C is in excess of the maximum approved amount X. If so (i.e. x>X), the bank 100 will retrieve H from the second database 30M and offer the history of payment H by the electronic cash C as evidence of an attack to the trustee 400. The trustee 400 uses the anonymous public information contained in the history H to search the correspondence table 41T for the attacker's identification information $ID_U$, by which the trustee 400 can determine his identity.

When given an order or authorization from a court or similar official third party irrespective of the operation by the bank 100 for the detection of an attack from the communication history H, the bank 100 and the trustee 400 retrieve the identification information $ID_U$ and anonymous public key N of the user specified by the official third party from the communication history H placed under the control of the bank 100 and the correspondence table 41T held by the trustee 400, respectively, and they offer the pieces of information thus found out to the official third party.

Divisional Transferring of Electronic Cash

Figure 7:
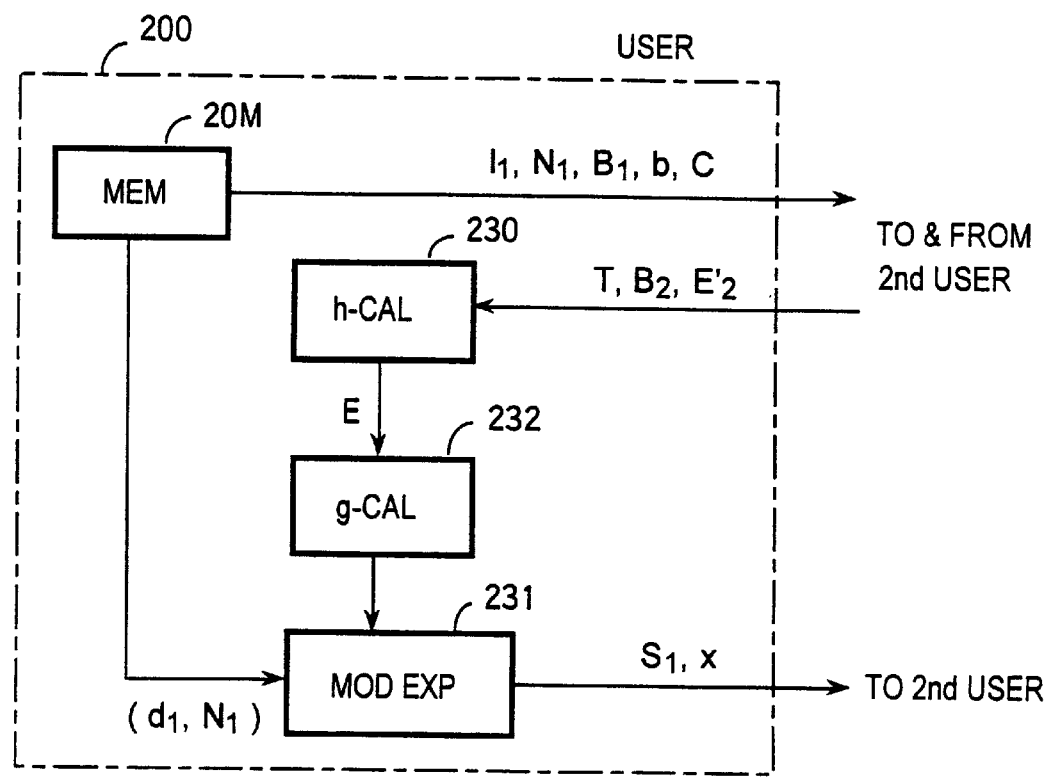
FIG. 7 is a block diagram showing processing by the user 200 for transferring of electronic cash from the user 200 to another user 500 in FIG. 1.
Figure 8:
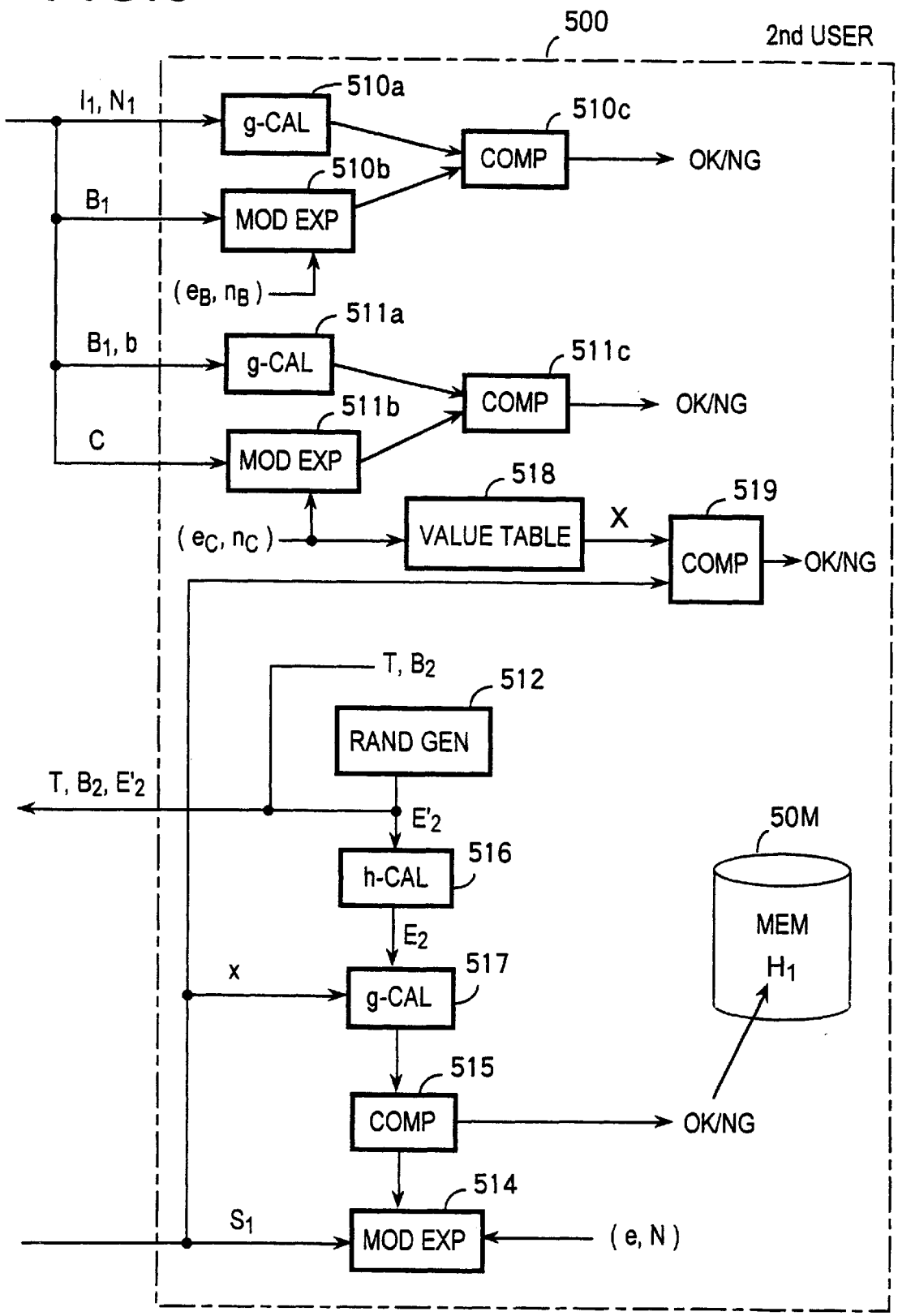
FIG. 8 is a block diagram showing processing by the user 500 for transferring of electronic cash from the user 200 and to the user 500 in FIG. 1.
Figure 9:
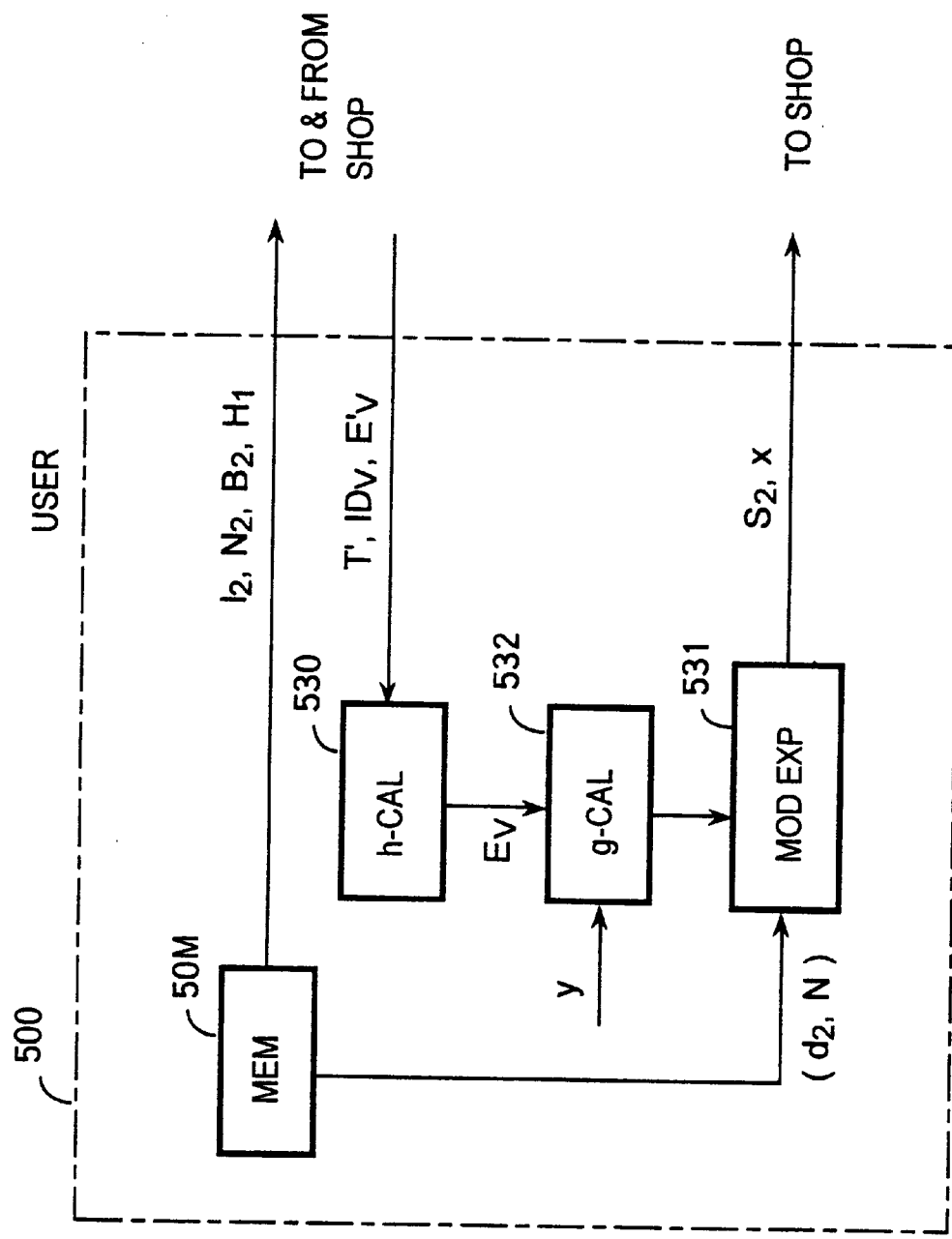
FIG. 9 is a block diagram showing processing by the second user 500 for payment by transferred electronic cash to the shop in FIG. 1.

Turning now to FIGS. 7, 8 and 9, a description will be given of the case where the user 200 divides the electronic cash C issued from the bank 100 and transfers the divided amount of money to another user 500. Here, it is supposed that a suffix "1" is attached to each of symbols representing the first user's (200) keys and pieces of other information and a suffix "2" is attached to each of symbols representing the second user's (500) keys and pieces of other information. Let the license of the user 200 be represented by $(B_1, I_1, N_1)$, the electronic cash by (C,b) and the license of the user 500 by $(B_2, T_2, N_2)$. The functional configuration of the user 500 shown in FIG. 8 is virtually identical to the functional configuration of the user 300 in FIG. 5.

Step 1: the user 200 transmits the license $(B_1, I_1, N_1)$ and the electronic cash (b,C) to the user 500.

Step 2: The user 500 verifies the validity of the signature $B_1$ to $(I_1, N_1)$ (i.e. the validity of the license) by checking whether $B_1$ satisfies the following equation, using a g-calculator 510a, a modular exponential calculator 510b and a comparator 510c:

$$B_1^{e_B} \equiv g(N_1 \| I_1)(\bmod n_B) \tag{10}$$

Furthermore, the validity of the signature C to $(B_1, b)$ (i.e. the validity of electronic cash) is verified by checking whether C satisfies the following equation, using a g-calculator 511a, a modular exponential calculator 511b and a comparator 511c:

$$C^{e_C} \equiv g(B_1 \| b)(\bmod n_C) \tag{11}$$

If either one of the signatures $B_1$ and C is found invalid, no further processing will be carried out.

Step 3: When both signatures B, and C are found valid, the user 500 generates a random value $E_2'$ by a random generator 512 serving as an inquiry or challenge generator, then sends it to the user 200 together with a signature $B_2$ to the user 500 and a time stamp T and calculates $E_2 = h(B_2 \| T \| E_2')$ by an h-calculator 516.

Step 4: The user 200 determines that he divides a certain amount of money x from the face value of the electronic cash C and transfers it to the user 500, and generates the following signature by the h-calculator 230, the g-calculator 232 and the modular exponential calculator 231:

$$S_1 = g(x \| h(B_2 \| T \| E_2'))^{d_1} \bmod N_1 \tag{12}$$

The signature $S_1$ and the amount of money x are sent to the user 500 as a response to his inquiry.

Step 5: Based on the public key $(e_C, n_C)$ having passed the checking of the validity of the electronic cash C, the user 500 detects the maximum available amount X approved for the electronic cash C from a value table 518, then compares its value A and the amount x by a comparator 519 to see if the latter does not exceed the former, and if so, the user 500 halts the subsequent processing.

If the amount x is smaller than the approved amount X, the user 500 verifies the validity of the signature $S_1$ by the following equation through the use of a g-calculator 517, a modular exponential calculator 514 and a comparator 515:

$$S_1^{e_1} \equiv g(x \| E_2)(\bmod N_1) \tag{13}$$

When this verification succeeds, the user 500 regards the user's transfer of the amount x as valid and receives it accordingly.

Payment by Divided, Transferred Electronic Cash

A description will be given, with reference to FIGS. 9 and 5, of the procedure for the user 500 to make the payment to the shop 300 by the electronic cash transferred from the user 200.

Step 1: The user 500 reads out of a memory 50M the license $(B_2, I_2, N_2)$ and a history of communications $H_1$ $(I_1, N_1, B_1, b, C, x, T, E_2', S_1)$ conducted with the user 200 for the electronic cash transfer therefrom, the license and the communication history being sent to the shop 300.

Step 2: The shop 300 verifies the validity of the signature $B_2$ to $(I_2, N_2)$ (i.e. The validity of the license) by checking whether $B_2$ satisfies the following equation, through the use of the g-calculator 310a, the modular exponential calculator 310b and the comparator 310c:

$$B_2^{e_B} \equiv g(N_2 \| I_2)(\bmod n_B) \tag{14}$$

Furthermore, the shop 300 verifies the validity of the communication history $H_1$ as well (the same as the checking of the validity of electronic cash transfer and the payment by electronic cash).

If these checks do not pass no further processing will be continued.

Step 3: When these checks pass the shop 300 generates a random value $E_V'$ by the random generator 312, then sends it to the user 500 together with the identifier $ID_V$ of the shop 300 and a time stamp T' and calculates $E_V = h(ID_V \| T' \| E_V')$ by the h-calculator 316.

Step 4: The user 500 determines that he spends an amount y of the transferred amount x, and generates a signature of the following equation with an h-calculator 530, a g-calculator 532 and a modular exponential calculator 531:

$$S_2 = g(y \| h(ID_V \| T' \| E_V'))^{d_2} \bmod N_2 \tag{15}$$

The signature $S_2$ and the amount y are sent to the shop 300.

Step 5: The shop 300 compares the transferred amount x in the communication history $H_1$ received from the user 500 with the amount y by the comparator 319 to see if the amount y is smaller than the transferred amount x of the electronic cash C. If this check does not pass, the shop 300 will halt the subsequent processing.

When this check passes, the shop 300 verifies the validity of the signature $S_2$ by the following equation through the use of the g-calculator 317, the modular exponential calculator 314 and the comparator 315:

$$S_2^{e_2} \equiv g(y\|E_V) \pmod{N_2} \tag{16}$$

When this verification succeeds, the shop 300 regards the user's payment in the amount y as valid and receives it.

As described above, the side which receives a divided piece of electronic cash when it is used (paid or transferred) only compares its amount with the approved maximum amount of the electronic cash, but an attack could be found by placing the history of the electronic cash under the supervision of the bank.

In the first embodiment the correspondence between the user identification information $ID_U$ and the anonymous public information N has been described to be held by one trustee 400. The trustee 400 may also be divided into a plurality of departments so that the user's name can be linked with his anonymous public information only when the departments cooperate. Moreover, when detecting an attack on the system, the bank 100 needs only to supply the trustee 400 with full anonymous public information N related to the corresponding electronic cash C; the full history H need not always be sent.

Second Embodiment

Figure 5:
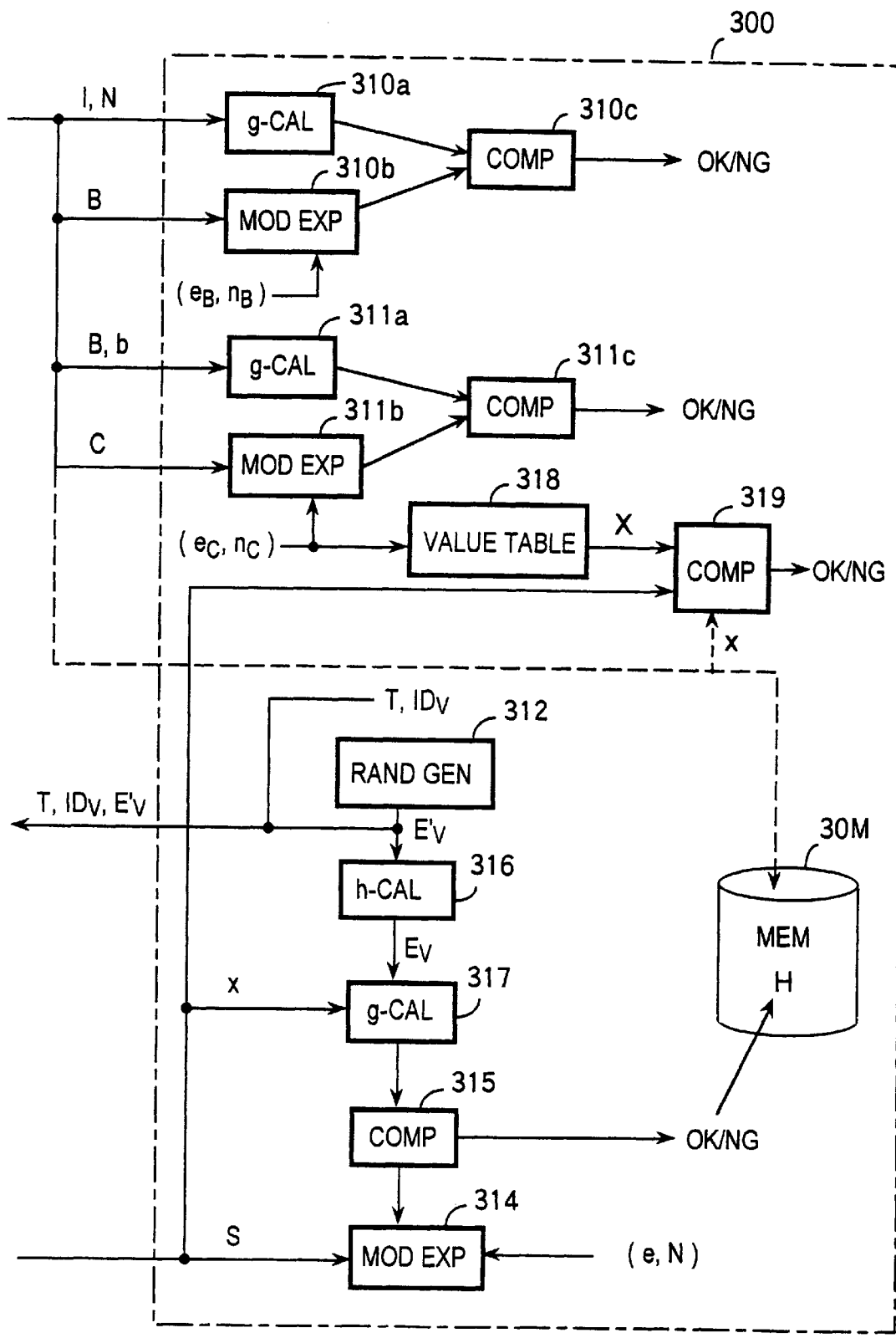
FIG. 5 is a block diagram showing processing by the shop for receiving the payment by electronic cash in FIG. 1.

The first embodiment has been described to employ the RSA digital signature and blind signature schemes, but as described previously, the present invention can be realized by using an arbitrary digital signature scheme and a signature scheme capable of the blind signature, predetermined in the system, for example, in the signature equation (2) of Step 4 in the procedure for the issuance of the license (FIG. 2), in the blind signature equations (3), (4) and (5) in the procedure for issuance of electronic cash (FIG. 3), in the user's signature equation (8) of Step 4 in the procedure for the payment of electronic cash to the shop (FIGS. 4 and 5), in the user signature equation (12) of Step 4 in the procedure for the transfer of electronic cash (FIGS. 7 and 8), or in the user signature equation (15) of Step 4 in the procedure for the use of the transferred electronic cash (FIGS. 9 and 5).

In the second embodiment the trustee 400 uses the "RSA" digital signature scheme for the user 200, the bank 100 uses the blind signature scheme based on zero-knowledge interactive proof by the "OO" scheme for the user 200, and the user 200 uses the "ESIGN" digital signature scheme for the shop 300.

Figure 10:
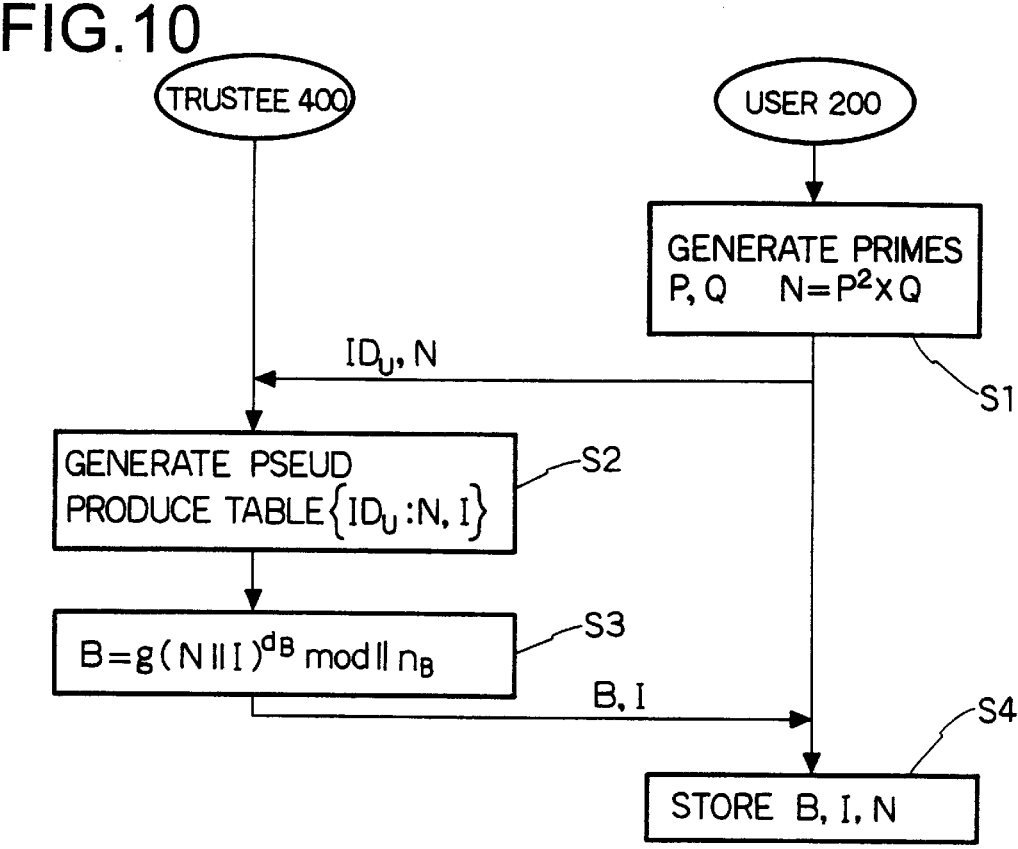
FIG. 10 is a diagram showing a license issuing procedure in a second embodiment of the present invention.

FIG. 10 illustrates the procedure for the user 200 to get the trustee 400 to issue the license.

Step S1: The user 200 generates two large prime numbers P and Q, then generates a composite number N ($N=p^2 \times Q$) as a public anonymous public key N by multiplication, which is stored in a memory and transmitted to the trustee 400.

Step S2: The trustee 400 checks the identity of the user 200 by some means and, when the check passes, keeps in secrecy the correspondence between the user 200 and the public anonymous key N through the use of a correspondence table, then generates information I such as the term of validity.

Step S3: Furthermore, the trustee 400 calculates a digital signature of the following equation by hash function g and modular exponential calculations through utilization of a secret key ($d_B, n_B$) for signature of the trustee 400 and sends the digital signature B and the information I to the user 200:

$$B \equiv g(N\|I)^{d_B} \bmod n_B$$

Step S4: The user 200 stores the data (B,I) received from the trustee 400 and the set of public keys N (B,I,N) generated in step S1 as a license in the memory (issuance of the license).

Figure 11:
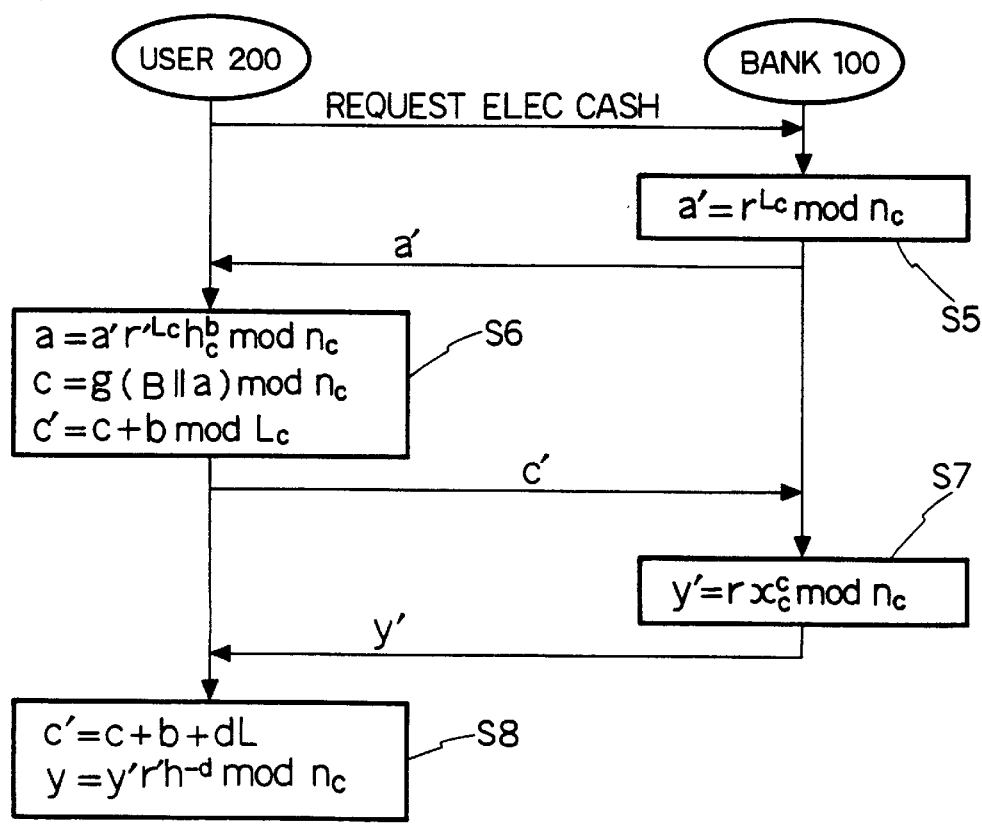
FIG. 11 is a diagram showing an electronic cash issuing procedure in the second embodiment.

FIG. 11 shows the procedure for the user 200 to have electronic cash issued by the bank 100.

Step S5: In response to a request of the user 200 for issuing electronic cash, the bank 100 generates a random value r, then calculates $$a' = r^{L_C} \bmod n_C$$

by the modular exponential calculation and transmits it to the user 200.

Step S6: The user 200 generates random values r' and b, then calculates $$a = a' r'^{L_C} h_C^b \bmod n_C$$

by the hash function g calculation and stores it in the memory, and calculates $$c = g(B\|a) \bmod n_C$$

by hash function g calculation and stores it in the memory; furthermore, the user 200 performs blind signature preprocessing $$c' = c + b \bmod L_C$$

by addition, subtraction and modular calculation and transmits it to the bank 100.

Step S7: The bank 100 uses the public key ($h_C, L_C, n_C$) corresponding to the face value of the electronic cash and a secret key $x_C$ to calculate a blind signature $$y' = r x_C^{c'} \bmod n_C$$

by modular exponential calculation and modular multiplication and transmits it to the user 200. At the same time, the bank 100 withdraws the amount concerned from user's account, or receives the amount from the user 200 by some means.

Step S8: The user 200 computes, by addition, subtraction and modular calculation, d which satisfies $$c' = c + b + dL$$

and performs blind signature postprocessing $$y = y' r' h^{-d} \bmod n_C$$

by modular exponential calculation and modular multiplication and stores a and c as the electronic cash C={a,c,y} in the memory (withdrawal of electronic cash).

Figure 12:
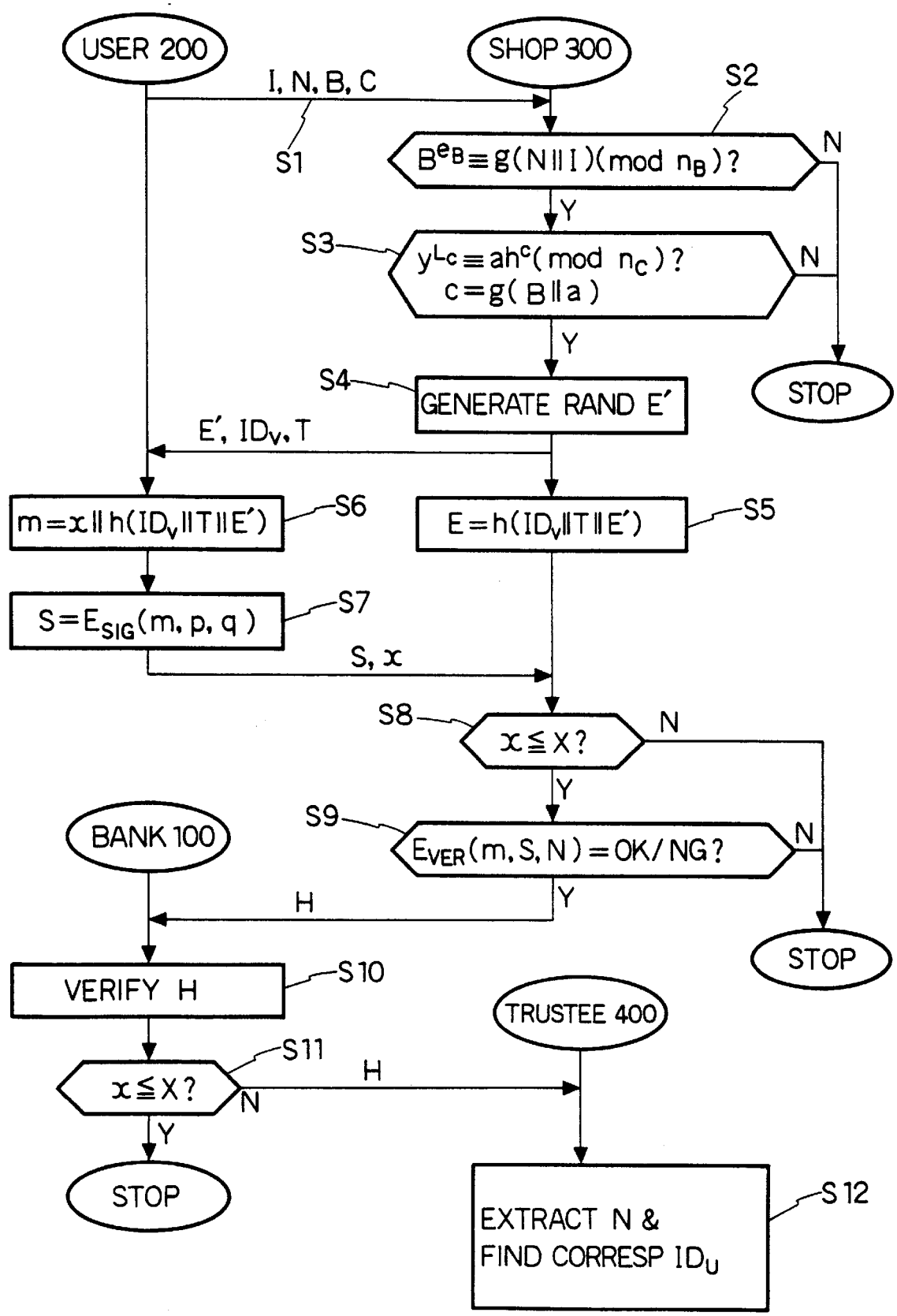
FIG. 12 is a diagram showing a procedure for the payment to the shop by electronic cash in the second embodiment.

FIG. 12 shows the procedure for the user 200 to make payment to the shop 300 by the electronic cash C, the procedure for the subsequent settlement of accounts between the shop 300 and the bank 100, and the presentation of information from the bank 100 to the trustee 400.

Step S1: The user 200 sends I,N,B,C to the shop 300.

Step S2: The shop 300 verifies the validity of the signature B to (I,N) by checking to see if the signature B satisfies the following equation (the validity of the license)

$$B^{e_B} \equiv g(N\|I) \pmod{n_B}$$

by hash function g calculation, modular exponential calculation and comparison through utilization of the public key $(e_B, n_B)$ for signature of the trustee 400, and the shop 300 verifies the validity of the electronic cash C={a,c,y} to the signature B by checking to see if the signature B satisfies the following equation (the validity of the electronic cash)

$$y^{L_C} \equiv ah^C \pmod{n_C}$$

$$c = g(B\|a)$$

by modular exponential calculation and comparison through utilization of the public key $(h_C, L_C, n_C)$ of the bank 100. When these checks do not pass, no further processing is carried out.

Step S4: When these checks pass, the shop 300 generates the random value E' and sends it to the user 200 together with the identifier $ID_V$ of the shop 300 and the time stamp T.

Step S5: Moreover, the shop 300 calculates the following equation by hash function h calculation:

$$E = h(ID_V\|T\|E')$$

Step S6: The user 200 determines that he spends the electronic cash c in the amount x, and calculates $$m = x\|h(ID_V\|T\|E')$$

by the hash function h.

Step S7: Further, the user 200 uses his secret key (p,q) to generate an ESIGN signature S by the following equation $$S = E_{SIG}(m, p, q)$$

and sends the amount x and the signature S to the shop 300.

Step S8: The shop 300 makes a check to determine if the amount x does not exceed the approved maximum amount X of the electronic cash C, and if this check does not pass, no further processing will be carried out.

Step S9: When the check passes, the shop 300 uses m, S and N to check the validity of the ESIGN signature S by the following equation $$E_{VER}(m, S, N) = OK/NG$$

When this check passes, the shop 300 regards the payment by the user 200 of the amount corresponding to that x as being valid and receives it (payment by electronic cash) and supplies the bank 100 with the history H of communications conducted between the shop 300 and the user 200 when the electronic cash was spent.

Step S10: The bank 100 checks the validity of the communication history H and, if the check passes, stores the history H and pays the amount concerned into the account of the shop 300, or pays the amount to the shop 300 by some means (conversion of electronic cash).

Step S11: Further, the bank 100 places the history H under its supervision to prevent the electronic cash c from being spent in excess of its approved maximum amount (supervision of electronic cash). If the electronic cash c is spent in excess of the maximum amount, the bank 100 will present, as evidence of abuse, the history H of all payments made by the electronic cash C.

Step S12: The trustee 400 extracts the public information N from the history H and searches the correspondence table of the identification information $ID_U$ and the public information N for particular user identification information $ID_U$ to specify the attacker (detection of attacker).

Figure 13:
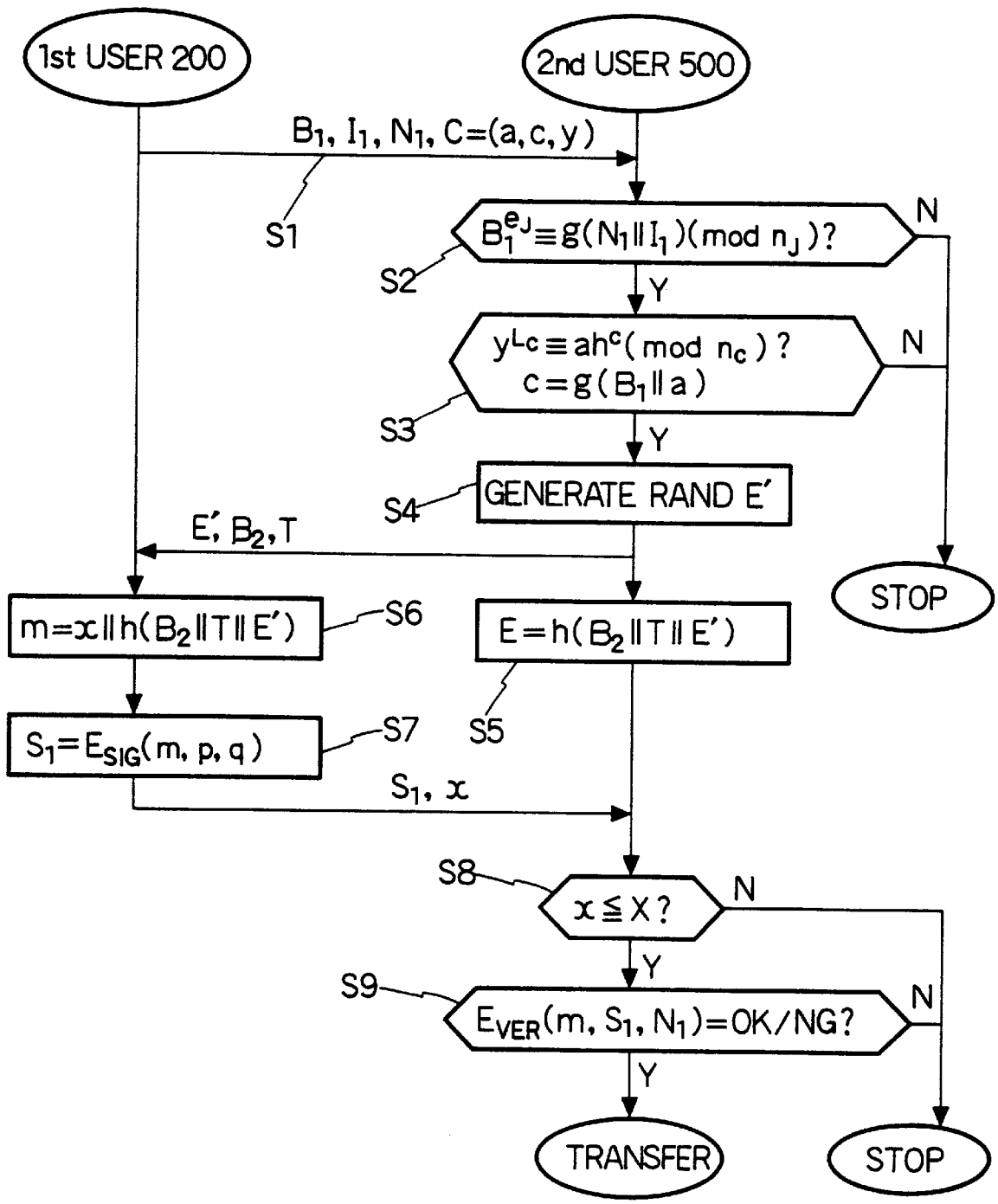
FIG. 13 is a diagram showing an electronic cash divisional-transferring procedure in second embodiment.

FIG. 13 shows the procedure for the user 200 to divide and transfer the electronic cash C to another user 500.

Step S1: The user 200 sends the license $(B_1, I_1, N_1)$ and the electronic cash C={a,c,y} to the user 500.

Step S2: The user 500 verifies the validity of the signature $B_1$ to $(I_1, N_1)$ by checking to see if it satisfies the following equation (the validity of the license)

$$B_1^{e_B} \equiv g(N_1\|I_1) \pmod{n_B}$$

by hash function g calculation, modular exponential calculation and comparison.

Step S3: Further, the shop 300 verifies the validity of the electronic cash C={a,c,y} to the signature $B_1$ by checking to see if the following equation (the validity of the electronic cash) is satisfied by modular exponential calculation and comparison through utilization of the public key $(h_C, L_C, n_C)$ of the bank 100:

$$y^{L_C} \equiv ah^C \pmod{n_C}$$

$$c = g(B_1\|a)$$

When this check does not pass, no further processing is carried out.

Step S4: When this check passes, the user 500 generates the random value E' and sends it to the user 200 together with the signature $B_2$ of the user 500 and the time stamp T.

Step S5: Moreover, the user 500 calculates the following equation by hash function h calculation:

$$E = h(B_2\|T\|E')$$

Step S6: The user 200 determines that he transfers the electronic cash C in the amount x, and calculates $$m = x\|h(B_2\|T\|E')$$

by the hash function h.

Step S7: Further, the user 200 uses his secret key (p,q) and m to generate an ESIGN signature $S_1$ by the following equation $$S_1 = E_{SIG}(m, p, q)$$

and sends the amount x and the signature $S_1$ to the user 500.

Step S8: The user 500 makes a check to determine if the amount x does not exceed the approved maximum amount X of the electronic cash C, and if this check does not pass, no further processing will be carried out.

Step S9: When the check passes, the user 500 uses m, S and N to check the validity of the ESIGN signature S by the following equation $$E_{VER}(m, S, N) = OK/NG$$

When this check passes, the user 500 regards the transferring by the user 200 of the amount corresponding to that x as being valid and receives it (transferring of electronic cash).

Figure 14:
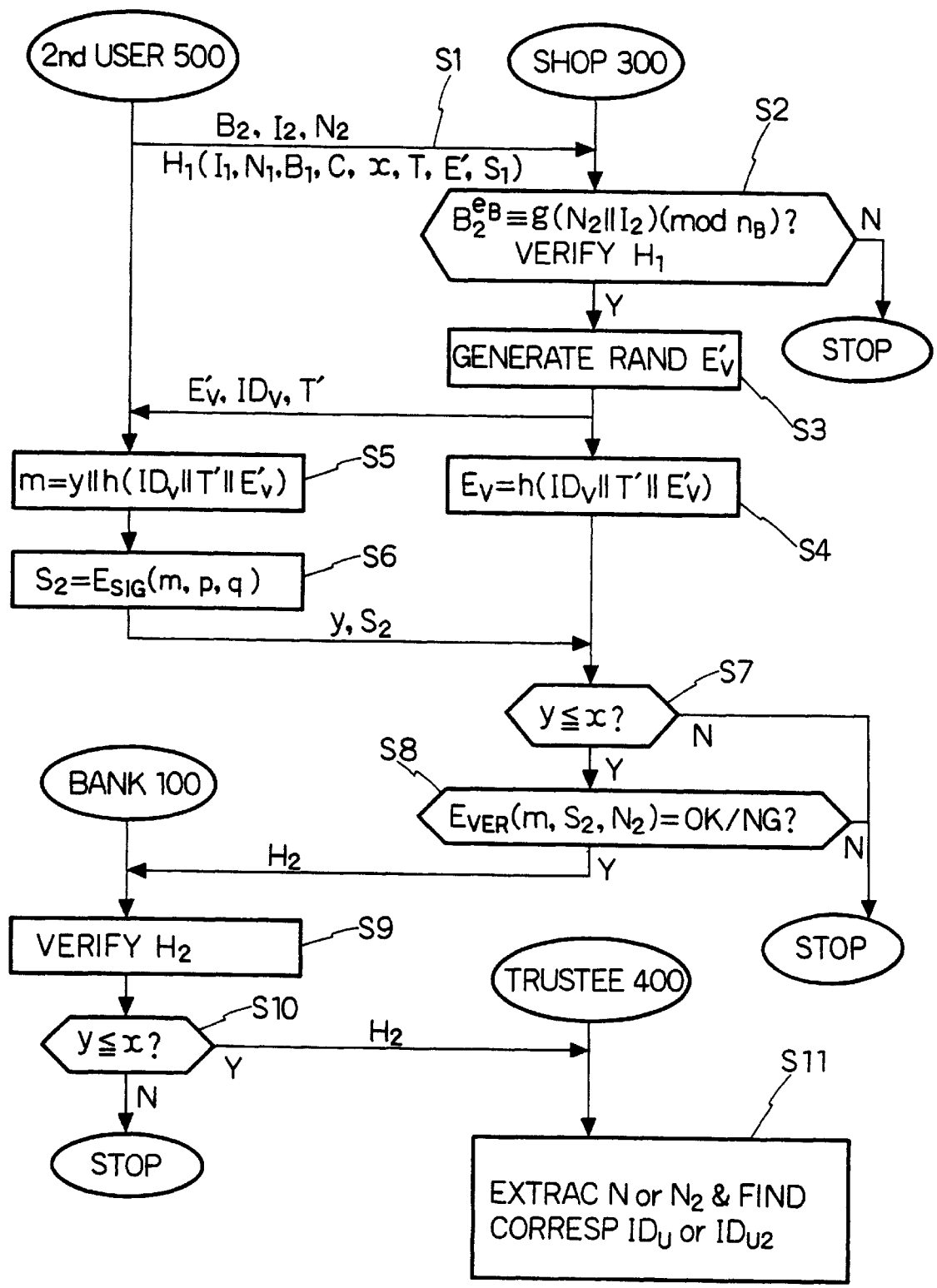
FIG. 14 is a diagram showing a procedure for the divisional-transferring of electronic cash in the second embodiment.

FIG. 14 shows the procedure for the payment to the shop by the divided, transferred electronic cash.

Step 1: The user 500 sends to the shop 300 the license $(B_2, I_2, N_2)$ and a history of communications $H_1$ $(I_1, N_1, B_1, b, C, x, T, E', S_1)$ conducted with the user 200 for the transferring therefrom of the electronic cash.

Step 2: The shop 300 verifies the validity of the signature $B_2$ to $(I_2, N_2)$ by checking whether it satisfies the following equation (the validity of the license), through hash g calculation, modular exponential calculation and the comparison:

$B_2^{eB} \equiv g(N_2 \| I_2)(\mod n_B)$

Furthermore, the shop 300 verifies the validity of the communication history $H_1$ as well. If this check does not pass, no further processing will be continued.

Step 3: When this check passes, the shop 300 generates the random value $E_V'$ and sends it to the user 500 together with the identification information $ID_V$ of the shop 300 and a time stamp T'.

Step S4: The user 500 calculates $E_V = h(ID_V \| T' \| E_V')$ by hash function h calculation.

Step S5: The user 200 determines that he spends an amount y of the amount x, and calculates $m = x \| h(ID_V \| T' \| E')$ by the hash function h.

Step S6: Further, the user 500 uses his secret key (p,q) and m to generate an ESIGN signature $S_2$ by the following equation $S_2 = E_{SIG}(m,p,q)$ and sends the amount y and the signature $S_2$ to the shop 300.

Step S7: The shop 300 makes a check to determine if the amount y does not exceed the transferred amount x of the electronic cash C, and if this check does not pass, no further processing will be carried out.

Step S8: When this check passes, the shop 300 uses m, S and N to check the validity of the ESIGN signature $S_2$ by the following equation $E_{VER}(m,S_2,N_2) = OK/NG$ When this check passes, the shop 300 regards the payment by the user 200 in the amount y as being valid and receives it (payment by electronic cash) and supplies the bank 100 with a history $H_2$ of all communications.

Step S9: The bank 100 checks the validity of the communication history $H_2$.

Step S10: The bank 100 makes a check to see if the amount y is smaller than the balance x and, if not, sends the communication history $H_2$ to the trustee 400.

Step S11: The trustee 400 extracts the public information N or $N_2$ from the history $H_2$ and searches the correspondence table for particular user identification information $ID_U$ or $ID_{U2}$.

Step S12: When given an order or authorization from a court or similar official third party irrespective of the operation by the bank 100 for the detection of an attack from the communication history H, the bank 100 and the trustee 400 retrieve the identification information $ID_U$ and anonymous public key N of the user specified by the official third party from the communication history H placed under the control of the bank 100 and the correspondence table 41T held by the trustee 400, respectively, and they offer the pieces of information thus found out to the official third party.

Third Embodiment

While in the above the license has been described to be issued by one trustee as shown in FIG. 1, for instance, the license may also be issued under the supervision of a plurality of trustees as referred to previously. With such an arrangement, the user who owns the license cannot be specified by one trustee alone, but the user who owns the license or electronic cash could be specified with the cooperation of all the trustees under the authorization of a court, for instance. An embodiment of this scheme will hereinbelow be described with reference to FIGS. 15 through 18.

Figure 15:
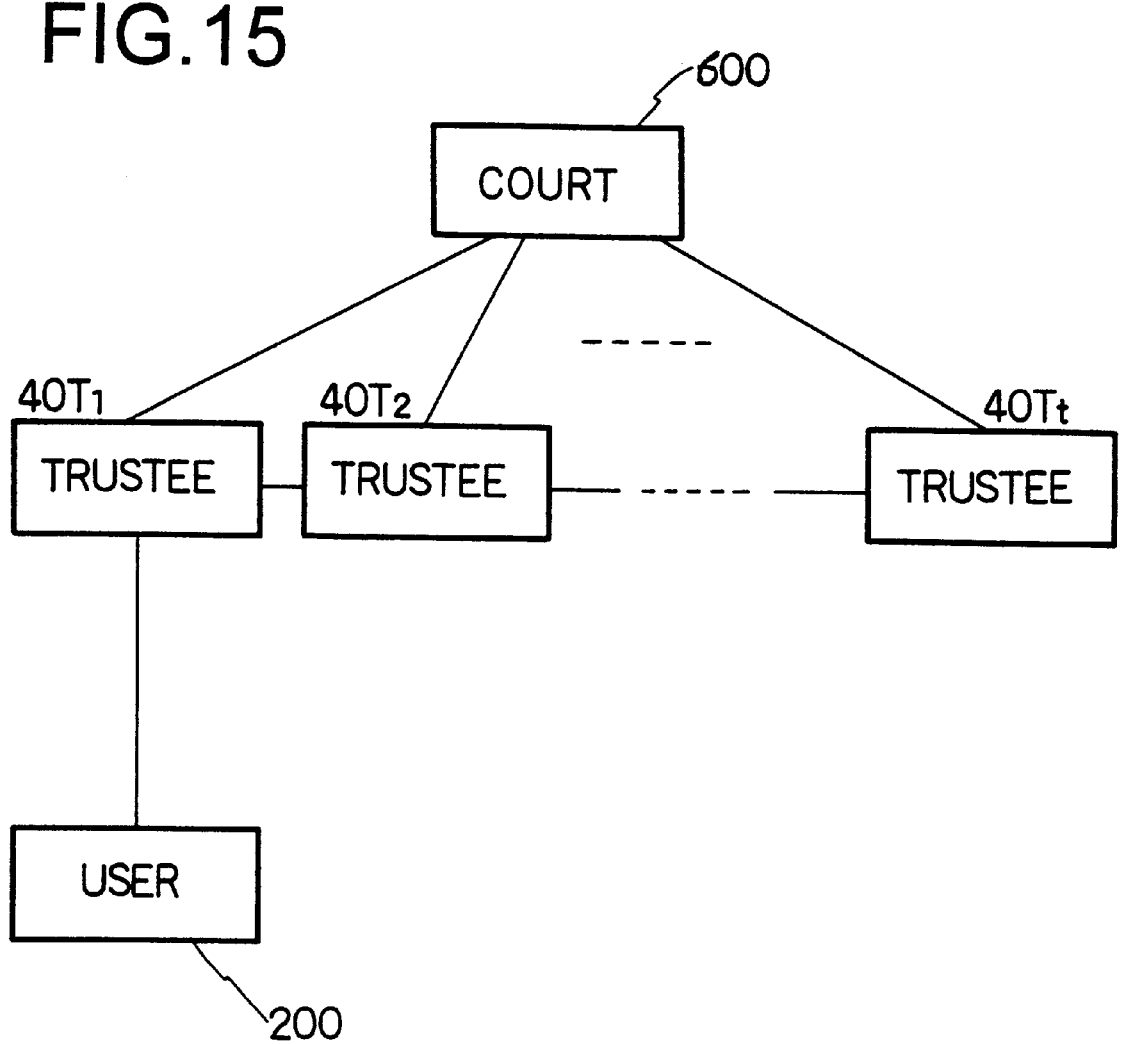
FIG. 15 is a diagram illustrating the system configuration in which a plurality of trustees perform the license issuance processing on a distributed basis according to a third embodiment.

FIG. 15 is a block diagram illustrating a basic configuration of this embodiment. A plurality of trustees $40T_1$ to $40T_t$, the user 200 and a court 600 are interconnected, for example, via communication lines, but they may be interconnected via a smart card or the like on which information can be recorded. The signature system and public key cryptography which are used in this embodiment are based on the RSA scheme, and this embodiment can be implemented by an arbitrary one-way function g, a digital signature system and a public-key cryptosystem.

Preliminary Procedure g is set as a public one-way function, and $(\epsilon, \delta)$ is made public beforehand as a secret-key cryptosystem for making the procedure public. The devices for calculating them will hereinafter be called a g-calculator, $\epsilon$-encryptor and $\delta$-decryptor. In this embodiment, the signature algorithm and the public-key encryption algorithm which the trustee $40T_i$ uses are of the RSA scheme. These algorithms use the secret key and the public key $(d_{Ti}, n_{Ti})$ and $(e_{Ti}, n_{Ti})$ to calculate encryption processing function $E_i(x)$ and a decryption processing function $D_i(y)$ which are given by the following equations, respectively.

$E_i(x) = x^{e_{Ti}} \mod n_{Ti}$ $D_i(y) = y^{d_{Ti}} \mod n_{Ti}$

Procedure for Issuing License

The user 200 registers the composite number N with the trustee $40T_1$ and has it issue, as a license B of electronic cash, a signed receipt obtained by affixing a digital signature to the information N. The procedure for this is as described below with reference to FIGS. 16, 17 and 18.

Figure 16:
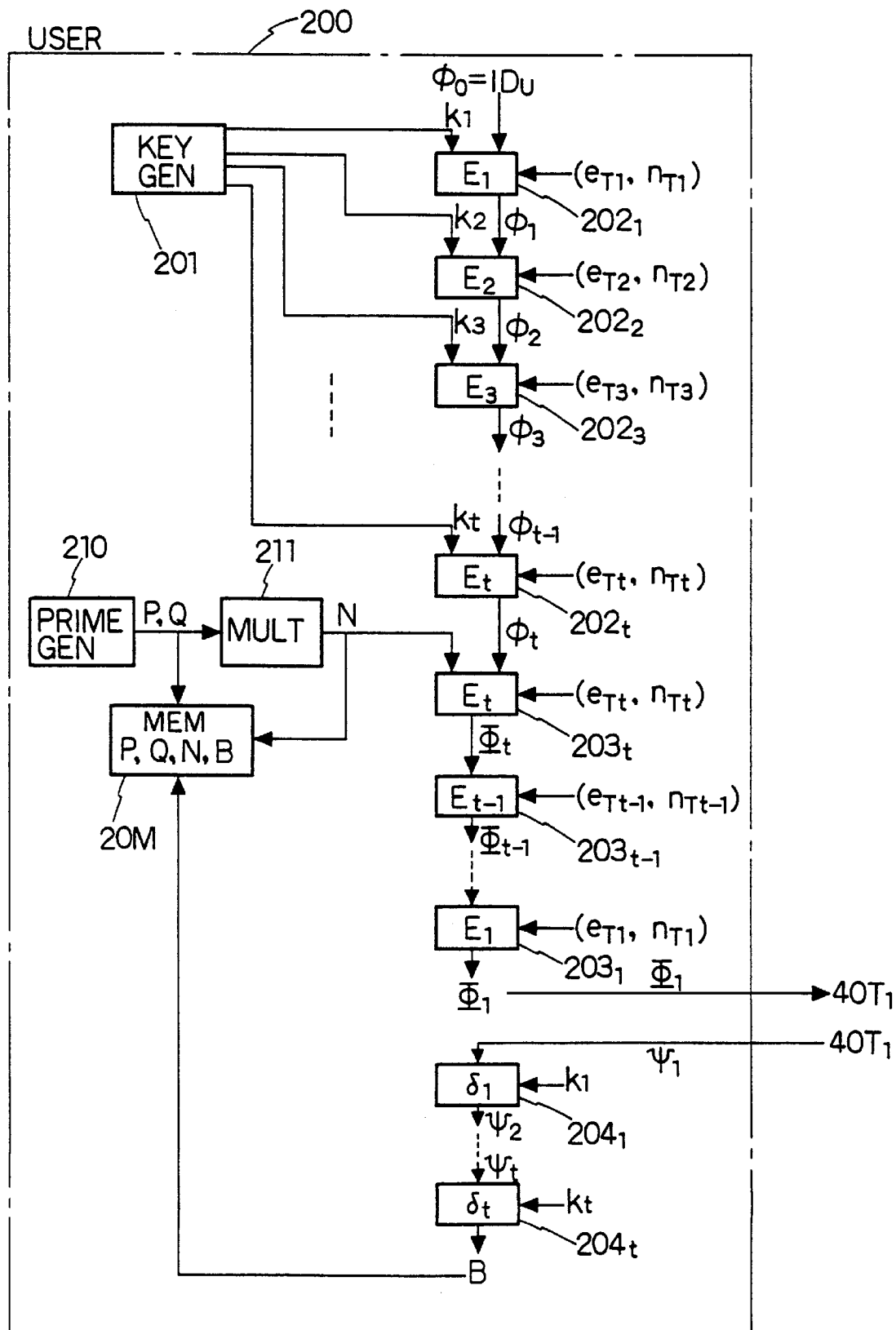
FIG. 16 is a functional block diagram showing processing by the user 200 in the license issuing procedure.

Step 1: The user 200 generates keys $(k_1, \ldots, k_t)$ of the same number as that of the trustees $40T_i$ by a key generator 201 (FIG. 16). The user 200 uses the public key $(e_{Ti}, n_{Ti})$ of the trustee $40T_i$ to recursively calculate $\phi_i = E_i(k_i \| \phi_{i-1})$ by public key encryptors $202_1$ to $202_t$, thereby obtaining $\phi_t$. Incidentally, let $\phi_o$ be identification information $ID_U$ of the user 200. Further, the user 200 calculates, by a multiplier 211, the product N of large prime numbers generated by a prime generator 210, then recursively calculates $\Phi_1 = E_1 o \ldots o E_t(N \| \phi_t)$ by public key encoders $202_1$ to $203_t$ through utilization of the public key $(e_{Ti}, n_{Ti})$ of the trustee $40T_i$ and transmits $\Phi_1$ to the trustee $40T_1$ as information containing N and $ID_V$. Here, $E_i o E_j(x)$ means $E_i(E_j(x))$.

Step 2; The trustee $40T_1$ uses the secret key $(d_{T1}, n_{T1})$ to calculate $\Phi_2 = D_1(\Phi_1)$ by a public key decryptor $401_1$ (FIG. 17), which is sent to the trustee $40T_2$.

Step 3: Each trustee 40Ti uses the secret key $(d_{Ti}, n_{Ti})$ to calculate $\Phi_{i+1} = D_i(\Phi_i)$ by the public key decryptor $401_i$ and transmits it to the next trustee $40T_{i+1}$ so that the trustee $40T_t$ will ultimately obtain $\phi_t$.

Step 4: The trustee $40T_t$ uses the secret key $(d_{Tt}, n_{Tt})$ to obtain $(N \| \Phi_t) = D_t(\Phi_t)$ and $(k_t \| \phi_{t-1}) = D_t(\phi_t)$ by the public key decryptor $401_t$. After obtaining N, $\phi_{t-1}$, $k_t$, the trustee $40T_t$ calculates g(N) by a g-calculator 412 and uses the secret key $(d_T, n_T)$ to generate the following digital signature for N by a digital signature generator 413.

$B = g(N)^{d_T} \mod n_T$

The information $k_T$ decrypted by the decryptor $402_t$ is a key assigned by the user to the trustee $40T_t$. The trustee $40T_t$ uses the information $k_T$ as a secret key to encrypt the signature B by an $\epsilon$-encryptor $405_t$ into $\Psi_t=\epsilon_{kt}(B)$, then transmits $(\phi_{t-1},\Psi_t)$ to the immediately preceding trustee $T_{t-1}$ and stores the information N, B, $\Psi_t$ in the memory $40M_t$.

Step 5: The trustee $40T_i$ uses the secret key $(d_{Ti}, n_{Ti})$ to calculate $(k_i\|\phi_{i-1})=D_i(\phi_i)$ by a public key decryptor $402_i$ and uses $k_i$ as a secret key to calculate $\Psi_i=\epsilon_{ki}(\Omega_{i+1})$ by an $\epsilon$-encryptor $405_i$. $(\phi_{i-1},\Psi_i)$ is transmitted to the immediately preceding trustee $40T_{i-1}$, while at the same time $\Psi_i$ and $\Psi_{i+1}$ are stored in the memory $40M_i$. By repeating this, the trustee $40T_2$ ultimately obtains $\phi_1$ and $\Psi_2$ from the public key encryptor $402_2$ and the encryptor $405_2$, respectively.

Step 6: The trustee $40\%1$ uses the secret key $(d_{T1}, n_{T1})$ to calculate $(k_1\|ID_U)=D_1(\phi_1)$ by the public key decryptor $402_1$ and specifies the user 200 by the thus obtained identification information $ID_U$. Further, the trustee $40T_1$ uses $k_1$ to calculate $\Psi_1=\epsilon_{k1}(\Psi_2)$ by the $\epsilon$-encryptor $405_1$, after which the trustee $40T_1$ transmits $\Psi_1$ to the user 200 and stores $\Psi_1$ and $\Psi_2$ in the memory $40M_1$ in correspondence with the identification information $ID_U$.

Step 7: The user 200 uses the keys $(k_1, \ldots, k_t)$ to obtain a receipt as the following license B by decryptors $204_1$ to $204_t$.

$$B=\delta_{kt}o \ldots o\delta_{k1}(\Psi_1)=g(N)^{dT} \bmod n_T$$

By the above-described processing, the trustee $40T_1$, the trustee $40T_t$ and the other trustees $40T_i$ store the correspondence of the information $ID_U$, $\Psi_2$ and $\Psi_1$, the correspondence of the information N, B and $\Psi_1$ and the correspondence of the information $\Psi_{i+1}$ and $\Psi_i$ as registered information in their memories $40M_1$, $40M_t$ and $40M_i$, respectively, and keep them in secrecy. On the other hand, the user 200 can get the electronic cash C, described previously in the first or second embodiment, issued by the bank 100 by using the license B given to the user 200 and can spend the electronic cash c at the shop 300. Incidentally, in this embodiment, the information N received from the user 200 is used as his pseudonym I, and the correspondence of the information N as the pseudonym and the user's real name (identification information $ID_U$) is held by all the trustees $40T_1$ to $40T_t$ through the medium of the information $\Psi_i$. In this way, the pseudonym I can freely be determined by the trustee in correspondence with the user identification information $ID_U$. This applies to the first and second embodiments.

Identification of User from Registered Information and vice versa

User from (N,B)

Figure 18:
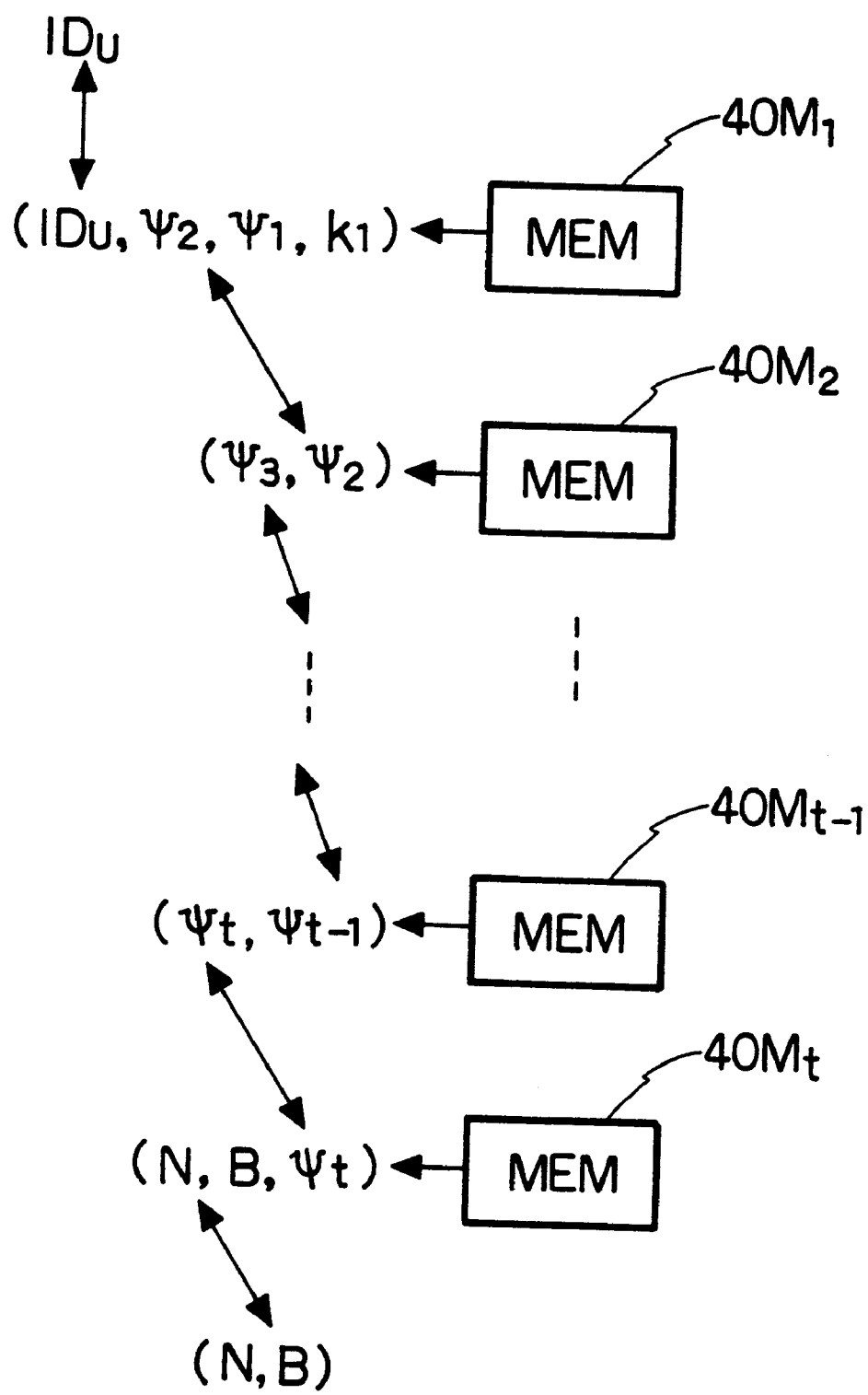
FIG. 18 is a diagram explanatory of processing for tracing the user on the basis of information(N,B) and for tracing the information (N,B) on the basis of the identity of the user.

The following is the procedure by which the trustees $40T_1$ to $40T_t$ find out the user 200 from the information (N,B) by the use of the memories $40M_1$ to $40M_t$ at the request of a trustworthy third party (a court, for instance) (see FIG. 18).

Step 1: The trustworthy third party (a court, for instance) transmits the information (N,B) to the trustee $40T_t$.

Step 2: The trustee $40T_t$ uses the license B to retrieve information $(N,B,\Psi_t)$ from the memory $40M_t$ and transmits $\Psi_t$ to the immediately preceding trustee $40T_{t-1}$.

Step 3: The trustee $40T_i$ uses $\Psi_{i+1}$ to retrieve information $(\Psi_{i+1},\Psi_i)$ from the memory $40M_i$ and transmits $\Psi_i$ to the immediately preceding trustee $40T_{i-1}$ (where i=t-1, t-2, . . . , 3, 2).

Step 4: The trustee $40T_1$ uses $\Psi_2$ to retrieve information $ID_U,\Psi_2,\Psi_1)$ from the memory $40M_1$, then specifies the user 200 by the information $ID_U$ and informs the trustworthy third party (a court, for instance) of the identified user 200.

(N,B) from User

Figure 19:
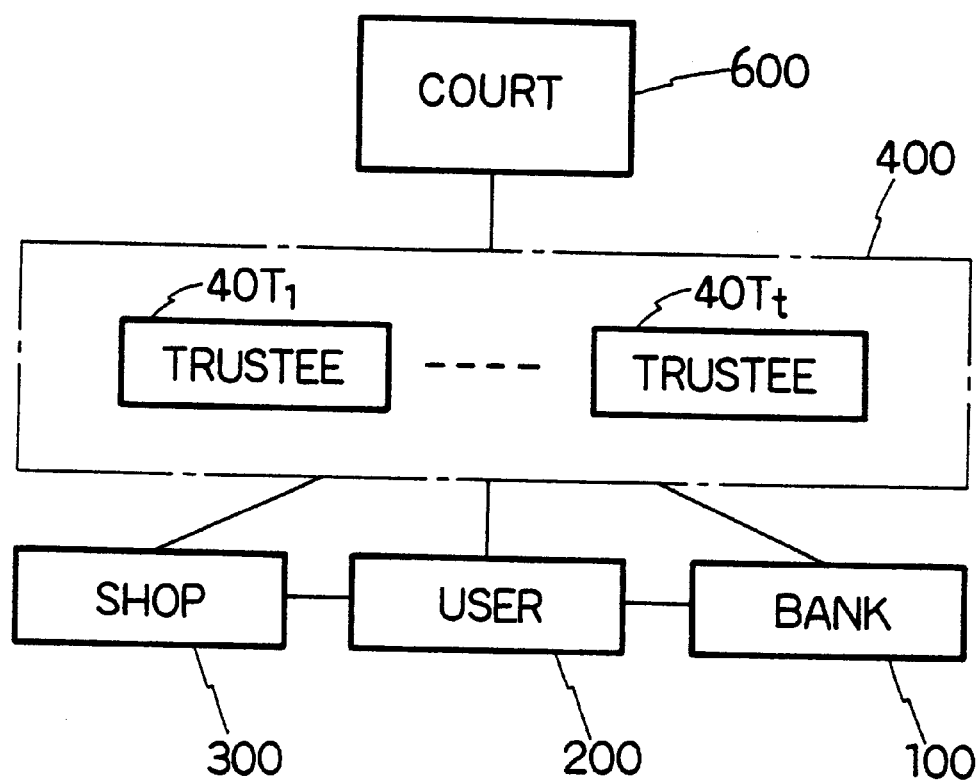
FIG. 19 is a diagram illustrating a system configuration for registering random values with a plurality of trustees in a fourth embodiment.

The following is the procedure by which the trustees $40T_1$ to $40T_t$ find out the payment history H of an attacker U by the use of the memories $40M_1$ to $40M_t$ at the request of a trustworthy third party (a court, for instance) (see FIG. 19).

Step 1: The trustworthy third party (a court, for instance) transmits attacker's identification information $ID_U$ to the trustee $40T_1$.

Step 2: The trustee $40T_1$ uses the identification information $ID_U$ to retrieve information $(ID_V,\Psi_2,\Psi_1)$ from the memory $40M_1$ and transmits $\Psi_2$ to the next trustee $40T_2$.

Step 3: The trustee $40T_i$ uses $\Psi_i$ to retrieve information $(\Psi_{i+1},\Psi_i)$ from the memory $40M_i$ and transmits $\Psi_{i+1}$ to the next trustee $40T_{i+1}$ (where i=2,3, . . . , t-1).

Step 4: The trustee $40T_t$ uses $\Psi_t$ to retrieve information $(N,B,\Psi_t,k_t)$ from the memory $40M_t$, then specifies the license B and informs the trustworthy third party (a court, for instance) of the specified license B.

Figure 17:
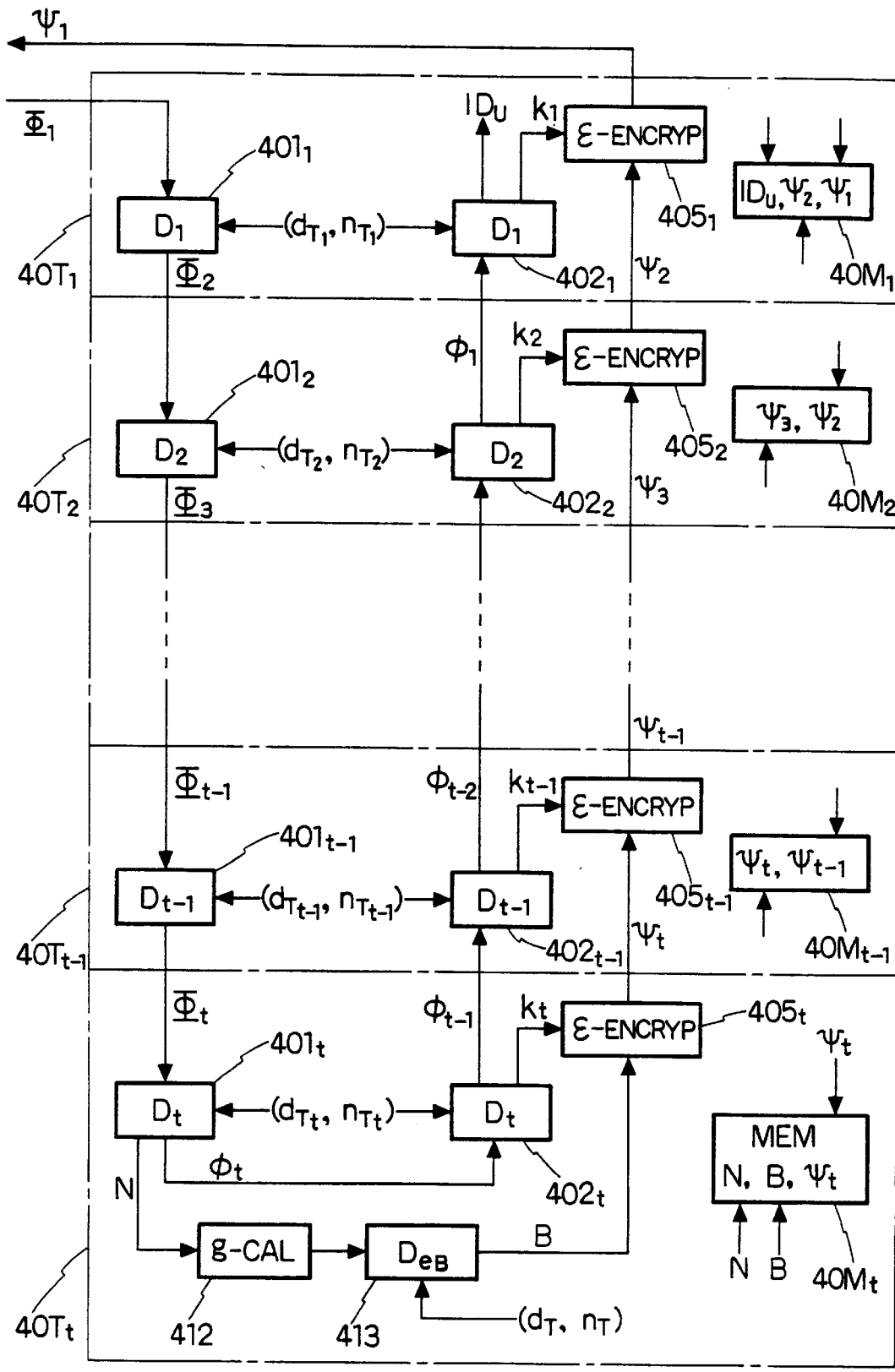
FIG. 17 is a functional block diagram showing processing by trustees $40T_1$ to $40T_r$ in the license issuing procedure.

Incidentally, in FIG. 17 it is also possible to employ a configuration in which each trustee $40T_i$ (where i=2, . . . , t-1) stores a pair of $\phi_i$ and $\phi_{i-1}$ in the memory $40M_i$ instead of storing the pair of $\Psi_{i+1}$ and $\Psi_i$, the trustee $40T_t$ stores a pair of $\phi_t$ and $\phi_{t-1}$ in the memory $40M_t$ instead of storing $\Psi_t$ and the trustee $40T_1$ stores $\phi_1$ in the memory $40M_1$ instead of storing the pair of $\Psi_2$ and $\Psi_1$. Also in such an instance, it is possible to trace the user identification information $ID_U$ on the basis of the information (N,B) and vice versa.

As described above, according to the third embodiment, the relationship between the user 200 and the information (N,B) can be held secret unless all the trustees $40T_1$ to $40T_t$ conspire together. On the other hand, it is also possible to trace the user (identification information $ID_U$) from the information (N,B) and vice versa with the cooperation of the trustees $40T_1$ to $40T_t$. This tracing is easy and does not invade privacy of the other users. The FIG. 17 embodiment shows, as an example of decentralized processing by a plurality of trustees for issuing the license, the case where the user exchanges information with one trustee alone, the plurality of trustees sequentially process information and the correspondence table $40T_i$ of each trustee stores information sequentially associated with the information pair of the adjacent trustee like the pair of information $(\Psi_i, \Psi_{i-1})$, but it is also possible to employ a configuration in which the user communicates directly with the individual trustees, providing them with associated information.

Fourth Embodiment

In the embodiment of FIG. 15, the secret information of each user is registered by decentralized processing of a plurality of reliable institutions (trustees) by which, when a user makes an attack on the electronic cash system, such as a counterfeit or double spending of the electronic cash, the attacker can be specified from his transaction history with the cooperation of all the trustees under the authorization of a court, for instance. However, this system is helpless when the secret key of the bank or trustee is stolen or extorted.

To prevent a crime when the secret key of the bank or trustee is stolen or extorted, a random value λ which is used when the user requests the bank to issue electronic cash is entrusted to the trustees $40T_1$ to $40T_t$ on a secret-sharing basis. The secret-sharing scheme is described in detail in A. Shamir, "How to share a secret," Communications of the ACM, v. 24, n. 11, November 1979, pp. 612–613. In the event that the secret key of the bank is broken, stolen or extorted, the random value λ is restored with the cooperation of the trustees $40T_1$ to $40T_t$, and a correct random value table is made and is transmitted to the shop or used to answer its inquiry, by which it is possible to identify the suspect at the time of his payment to the shop.

This will be described below.

FIG. 19 illustrates in block form a fourth embodiment of the present invention. The trustees $40T_1$ to $40T_t$, the user 200, the bank 100, the court 600 and the shop 300 are interconnected via communication lines, for instance, but they may be interconnected via smart cards or the like on which information can be recorded.

The signature system and public key cryptography which are used in this embodiment are based on the RSA scheme, and this embodiment can be implemented by an arbitrary one-way function g, a digital signature system and a public-key cryptosystem.

Preliminary Procedure

In this embodiment, let it be assumed that the user has already gotten the license B issued by the trustee 400 through the license issuing procedure described previously, for example, with respect to the first embodiment shown in FIG. 2. In the electronic cash system of this embodiment, the user 200 entrusts the random value $\lambda$ to the trustees $40T_1$ to $40T_t$ on the secret-sharing basis when the user 200 requests the bank 100 to issue electronic cash. When the secret key or the like of the bank 100 is stolen or extorted, the random value $\lambda$ is restored with the cooperation of the trustees $40T_1$ to $40T_t$, and a correct random value table is made and is transmitted to the shop or used to answer its inquiry, by which it is possible to identify the suspect at the time of his payment to the shop.

A public one-way function g is predetermined. The device for calculating this will hereinafter be referred to as a g-calculator. A parameter r for decentralized control of the random value $\lambda$ is made public. A calculator which outputs $\lambda(1), \ldots, \lambda(t)$ with respect to inputs $\lambda, \lambda_1, \ldots, \lambda_t$, respectively, will hereinafter referred to as a $\lambda$-calculator. A calculator which outputs $\lambda$ with respect to an input $\{\lambda(1), \ldots, \lambda(t)\}$ will hereinafter be referred to as a $\lambda$-decryptor. In this case, $$\lambda(x) = \lambda + \lambda_1 x + \ldots + \lambda_{t-1} x^{t-1} (\bmod\ r)$$

Apparently, the $\lambda$-calculator and the $\lambda$-decryptor can be executed by four operations of the modular exponential.

The signature algorithm and the public key cryptography of the trustee $40T_i$ and the bank 100 are assumed to be based on the RSA scheme. Let the secret key and public key of the trustee $40T_i$ be represented by $(d_{Ti}, n_{Ti})$ and $(e_{Ti}, n_{Ti})$, and the secret key and public key of the bank 100 by $(d_W, n_W)$ and $(e_W, n_W)$. Let the aggregate of trustees $40t_i$ be represented by $40T = (40T_1, \ldots, 40T_t)$.

The signature of the bank 100 is used to check the validity of electronic cash.

When it is desirable that the electronic cash issued by the bank 100 bear a plurality of monetary values, pairs of secret and public keys $(d_W, n_W)$ and $(e_W, n_W)$ of the same number as that of the monetary values are prepared and the monetary values and the public keys $(e_W, n_W)$ are both made public beforehand.

Procedure for Issuing Electronic Cash

Figure 20:
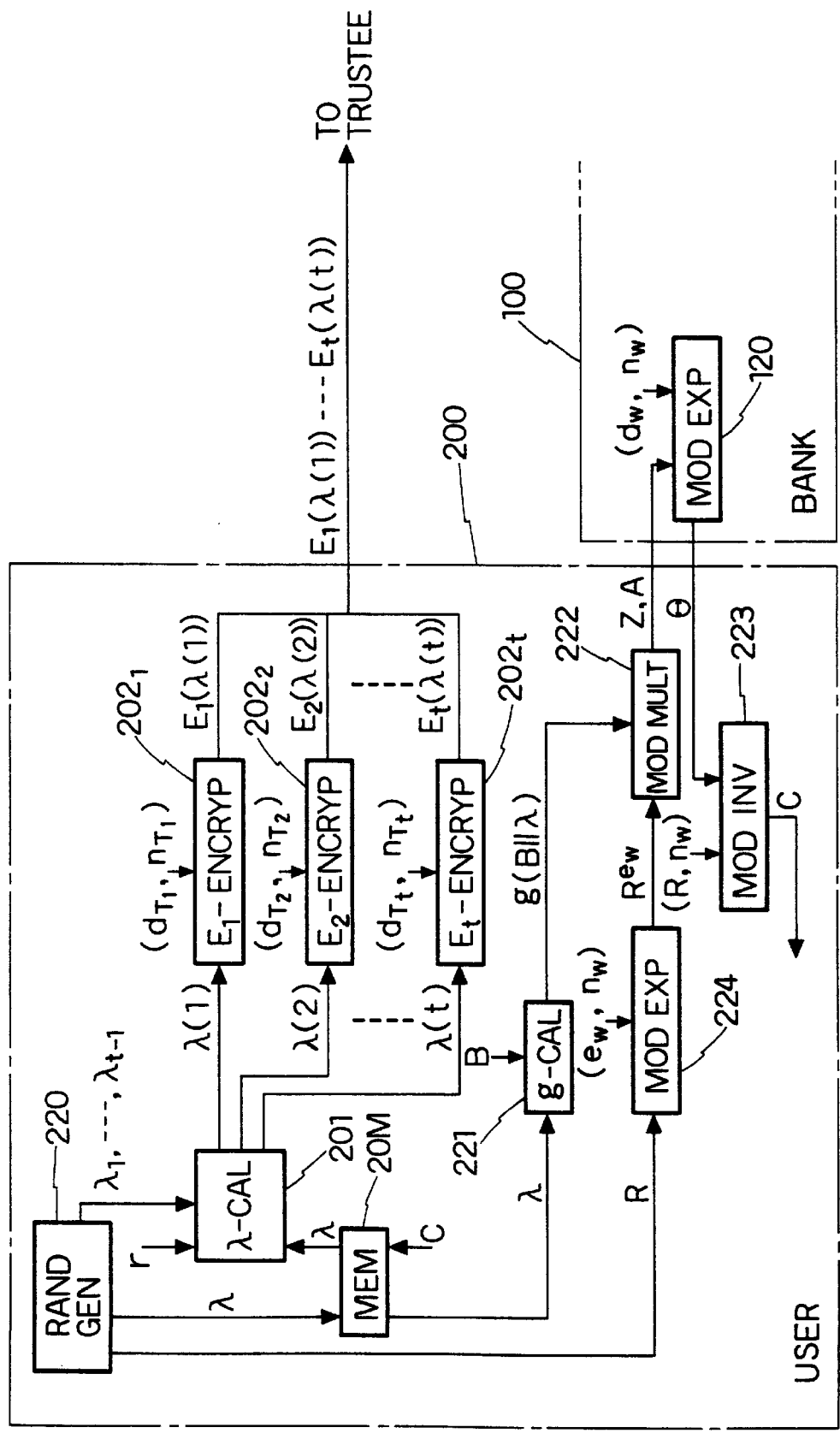
FIG. 20 is a block diagram illustrating the functional configuration for electronic cash issuance processing between the user and the bank in FIG. 19.

Next, a description will be given, with reference to FIG. 20, of the procedure which the user 200 follows to get the electronic cash C issued by the bank 100. Now, $(e_W, n_W)$ is a public key for a digital signature of the bank 100 which corresponds to the user's specified face value (X yen) of the electronic cash. The procedure for the user 200 to get the electronic cash C issued by the bank 100 is as follows.

Step 1: The user 200 generates the random value $\lambda$ by a random generator 220 and stores it in the memory 20M; furthermore, the user 200 generates random values $\lambda_1, \ldots, \lambda_{t-1}$ by a random generator 221. Next, the user 200 uses the public parameter r and the random value $\lambda$ read out of the memory 20M to calculate $\lambda(1), \ldots, \lambda(t)$ by a $\lambda$-calculator 201 from the following equation:

$$\lambda(x) = \lambda + \lambda_1 x + \ldots + \lambda_{t-1} x^{t-1}\ \bmod\ r$$

Additionally, the user 200 uses public keys $(e_{T1}, n_{T1})$ to $(e_{Tt}, n_{Tt})$ of the trustees $40T_1$ to $40T_t$ to calculate $E_1(\lambda(1))$ to $E_t(\lambda(t))$ by public key cryptography calculators $202_1$ to $202_t$, and sends them to the trustees $40T_1$ to $40T_t$, respectively.

The user 200 calculates $g(B\|\lambda)$ from the random value $\lambda$ and the license B. Further, the user 200 calculates $R^{eW}\ \bmod\ n_W$ by a modular exponential calculator 224 from the random value $\lambda$ by the random generator 220 and the public key $(e_W, n_W)$ corresponding to the face value information (X yen), and calculates the following equation $$Z = g(B\|\lambda) R^{eW}\ \bmod\ n_W$$

by a modular exponential calculator 222 to perform blind preprocessing and transmits Z to the bank 100 together with the face value information (X yen) of the electronic cash C.

Step 2: The bank 100 uses the secret key corresponding to the amount X of the electronic cash C to calculate $$\Theta = Z^{dW}\ \bmod\ n_W$$

by a modular exponential calculator 120 to make a provisional signature, which is sent to the user 200. At the same time, the bank 100 withdraws the amount X concerned from the account of the user 200 or receives the amount X from the user 200 by some other means.

Step 3: The user 200 uses the public key $(e_W, n_W)$ of the specified amount and a random value R to calculate $$C = \Theta/R\ \bmod\ n_W$$

by a modular inverse calculator 223 to perform blind post-processing to obtain the electronic cash C, which is stored in the memory 20M. It must be noted here that $$C = g(B\|\lambda)^{dW}\ \bmod\ n_W$$

Figure 21:
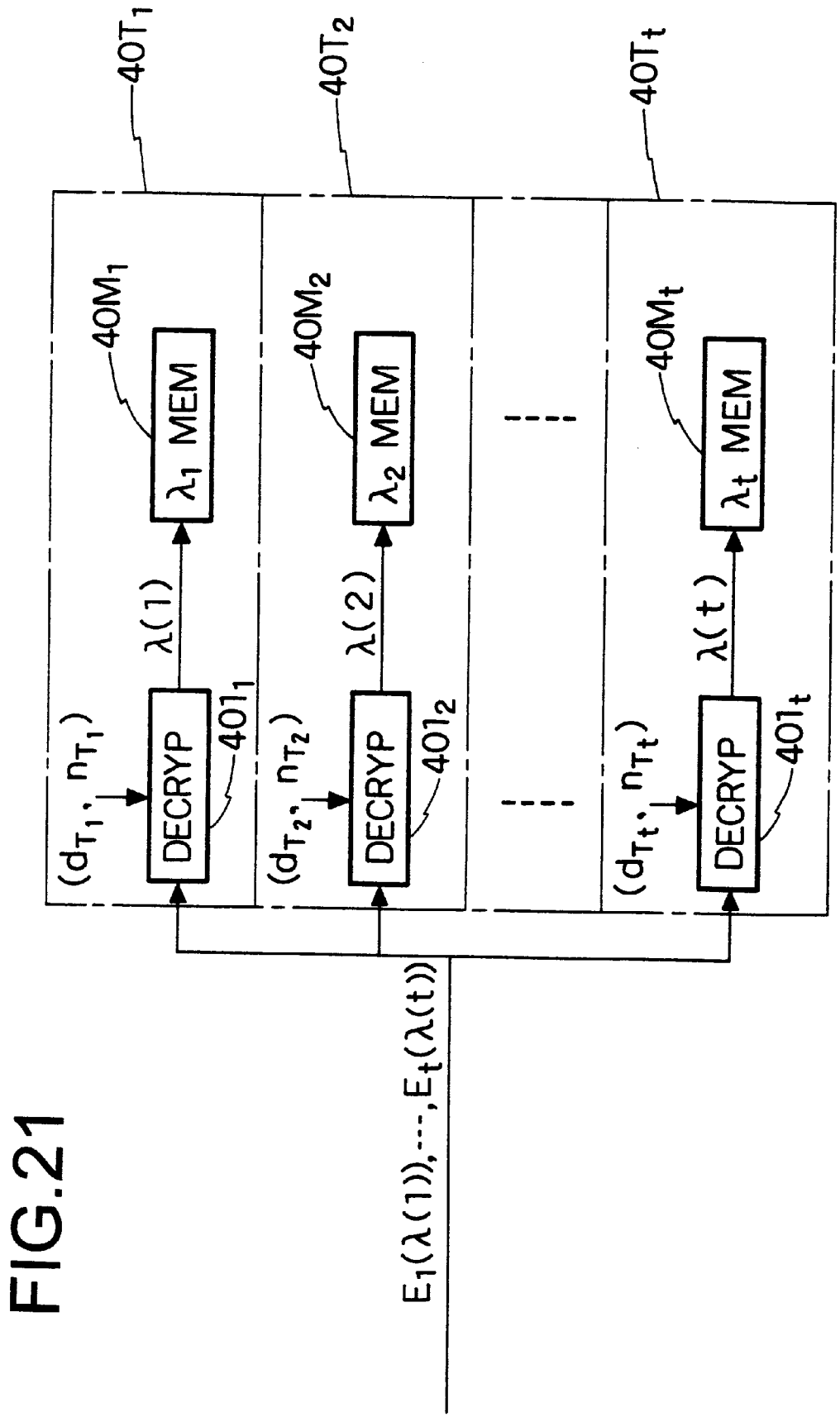
FIG. 21 is a block diagram illustrating the functional configuration for electronic cash issuance processing between the bank and trustees in FIG. 19.

Step 4: As depicted in FIG. 21, each trustee $40T_i$ uses the secret key $(d_{Ti}, n_{Ti})$ of its own to calculate a random value $\lambda(i)$ by a decryptor $401_i$ and stores it in the memory $40M_i$ in secrecy.

When the user 200 pays by the electronic cash C, he sends C and B to the shop 300 together with the random value $\lambda$. The shop 300 makes a check to see if C is an authorized signature of the bank 100 by the use of the public key $(e_W, n_W)$ of the bank 100 which corresponds to the amount X. That is, it is checked whether the following equation holds or not, and if it holds, the electronic cash C is regarded as being authorized.

$$C^{eW}\ \bmod\ n_W = g(B\|\lambda) \bmod\ n_W$$

Countermeasures against Crimes in Electronic Cash System

Figure 22:
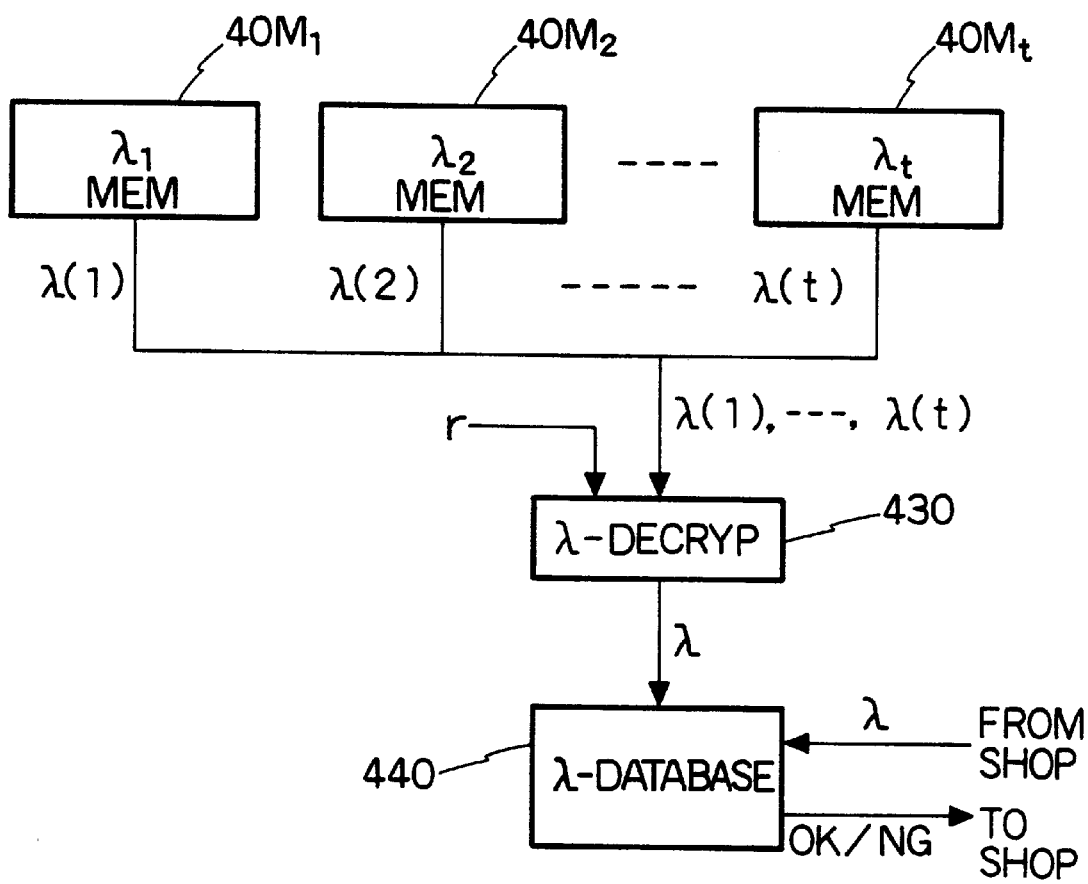
FIG. 22 is a block diagram illustrating the functional configuration for abuser tracing processing by the trustees and the shop in FIG. 19.

The following is the procedure for the trustees $40T_1$ to $40T_t$ to identify a criminal through the use of the memories $40M_1$ to $40M_t$ at the request of a reliable third party, for example, the court 600 (see FIG. 22).

Step 1: At the request of the court 600, for instance, the trustees $40T_1$ to $40T_t$ read out the secret information $\lambda(1)$ to $\lambda(t)$ from the memories $40M_1$ to $40M_t$. The secret information $\lambda(1)$ to $\lambda(t)$ and the parameter r are used to decrypt the random value 1 by a $\lambda$-decryptor 430 as given by the following equation, which is stored in a $\lambda$-database 440 of the trustee 40T:

$$\lambda(x) = \lambda + \lambda_1 x + \ldots + \lambda_{t-1} x^{t-1}\ \bmod\ r$$

This processing is carried out for each random value λ.

Step 2: At the time of payment from the user 200, the shop 300 inquires of the trustee 40T if the random value λ received from the user 200 is present in the λ-database, and if it is not present, the user 200 will be specified as an attacker.

According to this embodiment, if the secret key or the like of the bank 100 is stolen or extorted, the random value λ is restored with the cooperation of the trustees $40T_1$ to $40T_l$, and a correct random value table is made and is transmitted to the shop or used to answer its inquiry, by which it is possible to identify the suspect at the time of his payment to the shop.

As described above, according to the first and second embodiments of the present invention, only the trustee knows the correspondence of the anonymous public information N or I and the user identification information $ID_U$, but since only the anonymous public information N or I is available to the shop, user privacy is protected unless the trustee conspires with the shop.

To cope with money-laundering and other attacks on the electronic cash system, the trustee makes public the relationship between the user nave and the information N (or B) at the request of a trustworthy third party (a court, for instance). This stops transactions based on the anonymous public information N. Alternatively, the attacker can be arrested by tracing the transactions using the information N.

When the trustee is divided into a plurality of institutions as in the third embodiment of the invention, even the trustees cannot invade user privacy unless they conspire together.

With the user's random value λ registered with a plurality of trustees prior to the request for issuing electronic cash as in the fourth embodiment, if a crime occurs against the user or bank, it is possible to decrypt the corresponding random value λ with the cooperation of all the trustees at the request of, for example, a court and report it to the shop.

EFFECT OF THE INVENTION

The present invention produces such effects as listed below.

(a) Countermeasures Against Crimes

According to the present invention, electronic cash is realized by returning the communication history to the bank, so that when the user spends the electronic cash C twice or more, the bank can detect it by retrieving communication history files on the basis of the information C. Since the communication history information H contains the information N as well as C, the bank can learn the user's name (identification information $ID_U$) corresponding to the information N from the trustee on legal permission of a third party (a court order, for instance) and hence it can identify the user who committed the malicious play.

Furthermore, the bank and the trustee can cooperate to detect the relationship between the identification information ID and the information (I,N) on legal request or permission of the third party (a court, for instance). By this, even if nothing wrong is found in the electronic cash processing, it is possible to trace the electronic cash and/or user suspected of money-laundering or unauthorized financing.

(b) User Privacy

The smart card cannot ensure user privacy because the user identification information ID is directly available to the shop. The Chaum/Fiat/Naor scheme utilizes the blind signature, and hence the user can protect his privacy by himself, but it is pointed out that this may sometimes become a hotbed of crimes.

In the present invention, the bank does not know the correspondence between the identification information $ID_U$ and the anonymous public information (N or I) of users, and hence cannot violate their privacy unless the bank conspires with the trustee.

Furthermore, when the trustee is divided into a plurality of institutions, even they cannot invade users' privacy unless they conspire together.

(C) Traffic and Amount of Information Stored

In the Chaum/Fiat/Naor scheme which ensures user privacy, since the user embeds the identification information ID into the electronic cash, a cut-and-choose method is needed to check if the user operates as predetermined, and the amount of communication for issuing the license is large. Another problem is that a large amount of information of the communication history H has to be stored by the bank for detecting double usage of electronic cash.

According to the present invention, since the trustee and the bank perform the license issuing procedure and the electronic cash issuing procedure independently of each other, the amount of information to be processed for issuing the electronic cash can be reduced. Since two procedures are carried out by two institutions independent of each other like this, it is possible to preserve user privacy and reduce the amount of information to be processed, even if the cut-and-choose method is not employed (Let it be assumed that the license is available over a fixed period of time). By limiting user privacy available to the trustee which issues the license, the amount of information to be processed for issuing the license is reduced. In the Chaum/Fiat/Naor method, it is recommended from the viewpoint of safety that the value of K in the cut-and-choose procedure be normally about 30, but the present invention does not use the cut-and-choose procedure, that is, the value K is set at 1, so that the amount of communication for issuing the license can be reduced down to 1/20 that needed in the Chaum/Fiat/Naor method.

(d) Double Usage, Division and Transferring

According to the present invention, transfer or coupon-ticket-like usage of the electronic cash, which is impossible with the Chaum/Fiat/Naor method, can be implemented using the double usage detecting algorithm intact. For example, by making a signature which assures the payment (transfer) of an amount of money x (where $x \leq X$), the electronic cash C worthy of the amount of money X can be divided (transferred) and used accordingly.

What is claimed is:

1. An electronic cash implementing method for an electronic cash system which contains a trustee and a bank, said method comprising steps:

(1) wherein a user transmits his user identification information and an anonymous public key to said trustee;

(2) wherein said trustee stores the correspondence of said user identification information and said anonymous public key as a correspondence table in secrecy and generates and transmits a digital signature B of said trustee corresponding to said anonymous public key to said user;

(3) wherein said user stores said digital signature B of said trustee as a license, shows said license and a face value X to said bank and requests said bank to issue electronic cash C of said face value X; and (4) wherein said bank issues to said user, by a blind signature, said electronic cash C associated with said license and corresponding to said face value X.

2. The method of claim 1, further comprising steps:

(5) wherein said user shows said anonymous public key, said license and said electronic cash to a shop and uses said anonymous public key to generate a payment signature S assuring the payment of the amount of money spent and provides said signature to said shop; and (6) wherein said shop delivers payment history information H to said bank to settle therewith an account and obtain an amount of money corresponding to said amount spent.

3. The method of claim 2, further comprising a step wherein said bank makes a check to see if the total amount paid by said electronic cash is smaller than said face value X, and if so, extracts at least said anonymous public key of a history of all payments by said electronic cash and transmits it to said trustee.

4. The method of claim 1 or 2, further comprising a step wherein, wshen receiving an official order or permission of a third party, said bank and said trustee each retrieve one of identification information and anonymous public key of a user specified by said third party from said communication history placed under the supervision of said bank and said correspondence table held under the supervision of said trustee and inform said third party of said retrieved identification information and anonymous public key.

5. The method of claim 1, further comprising the steps:
(5) wherein a first user as said user shows said license and electronic cash C of said first user to a second user; and
(6) wherein said first user uses his anonymous public key $N_1$ to generate a transferring signature which assures the transferring of a divided amount x smaller than said face value X and providing said transferring signature to said second user.

6. The method of claim 5, further comprising a step wherein said second user shows to a shop a history of sa4d electronic cash at the time of transferring and said license of said second user and uses an anonymous public key $N_2$ of said second user to generate a signature assuring the payment of an amount y smaller than said divided amount and provides it to said shop to make the payment thereto.

7. The method of claim 1, wherein said digital signature in said step (2) is generated by a digital signature method based on an RSA scheme, and said blind signature in said step (4) is generated by a blind signature method based on said RSA scheme.

8. The method of claim 2, wherein said payment signature in said step (5) is generated by a digital signature method based on an RSA scheme.

9. The method of claim 5, wherein said transferring signature in said step (6) is generated by a digital signature method based on an RSA scheme.

10. The method of claim 1, wherein said digital signature in said step (2) is generated by a digital signature method based on an RSA scheme and said blind signature in said step (4) is generated by a blind signature method based on zero-knowledge interactive proof.

11. The method of claim 2, wherein said payment signature in said step (5) is generated by a digital signature method based on an ESIGN scheme.

12. The method of claim 7, wherein:
in said step (1), said user:
generates two large prime numbers P and Q; uses said prime numbers to calculate a composite number N=P×Q as said anonymous public key;
makes the following modular inverse calculation $$d=e^{-1} \bmod LCM(P-1,Q-1)$$

from said prime numbers P and Q and a key e common to all users, LCM(a,b) representing a least common multiple;

stores d and N in a memory; and
transmits N to a trustee;
in step (2), said trustee:
keeps the correspondence of said user and said N as said correspondence table in secrecy;
generates information I on the term of validity or the like;
generates, by one-way function g-calculation and modular exponential calculation, said digital signature expressed by the following equation $$B=g(N\|I)^{d_W} \bmod n_B$$

through use of a secret key $(d_B,n_B)$ for signature of said trustee; and
transmits said signature B and said information I to said user;
in step (3), said user:
stores information (B,I,N) from said trustee as said license in a memory;
generates and stores a random value b in said memory;
calculates a one-way function g(B∥b) from said random value b and said license (B,I,N) read out of said memory;
calculates the following equation $$Z=g(B\|b)r^{e_C} \bmod n_C$$

through use of public information $(e_C,n_C)$ of said bank corresponding to said face value; and
transmits said information Z to said bank, together with said amount information of said electronic cash; and
in said step (4), said bank:
calculates the following equation $$\Theta=Z^{d_C} \bmod n_C$$

through use of said Z received from said user and a secret key $(d_C,n_C)$ corresponding to said face value of said electronic cash; and
transmits said information Θ to said user; and
said user calculates the following equation $$C=\Theta/r \bmod n_C$$

through the use of said information Θ received from said bank and said public key $(e_C,n_C)$, thereby obtaining said electronic cash C of said specified face value.

13. The method of claim 8, wherein said step (5) comprises the steps:
(5-1) wherein said user sends information {I,N,B,b,C} to said shop;
(5-2) wherein said shop:
verifies the validity of said digital signature B for information (I,N) by checking whether said B satisfies $$B^{e_B}\equiv g(N\|I)(\bmod n_B)$$

through use of a public key $(e_B,n_B)$ for signature of said trustee;
verifies the validity of said electronic cash C for information (B,b) by checking whether said C satisfies the following equation $$C^{e_C}=g(B\|b)(\bmod n_C)$$

through the use of said public key $(e_C,n_C)$ of said bank;

when either verification fails, halts subsequent processing;

when either verification succeeds, generates a random value E' and sends it to said user together with identification information $ID_V$ and a time stamp T; and calculates therefor $E=h(ID_V\|T\|E')$ through the use of a one-way function h;

(5-3) said user calculates the following equation $$S=g(x\|h(ID_V\|T\|E'))^d \bmod N$$

as a payment signature for the amount spent x of said electronic cash C and sid information received from said shop through the use of a secret key (d,N) of said user; and sends said payment signature S and said information x to said shop; and said step (6) comprises the steps:

(6-1) said shop makes a check to see if said amount spent x is smaller than said face value X of said electronic cash C;

when said check does not pass, halts subsequent processing; and when said check passes, verifies the validity of said payment signature S by checking whether said S satisfies the following equation $$S^e \equiv g(x\|E) \pmod{N}; \text{ and}$$

(6-2) when this verification succeeds, said shop regards the payment of the amount corresponding to said amount x as being valid and receives it from said user.

14. The method of claim 9, wherein:

said step (5) comprises the steps:

(5-1) said first user sends said license $(B_1,I_1,N_1)$ and said electronic cash (b,C) to said second user;

(5-2) said second user:

verifies the validity of a signature B1 for said $(I_1,N_1)$ by checking whether said B1 satisfies the following equation $$B^{e_B} \equiv g(N_1\|I_1) \pmod{n_B};$$

verifies the validity of said electronic cash C for said $(B_1,b)$ by checking whether said C satisfies the following equation $$C^{e_C} \equiv g(B_1\|b) \pmod{n_C};$$

when either one of these checks does not pass, halts subsequent processing; and when both checks pass, generates a random value $E_2'$ and sends it to said first user together with a signature $B_2$ for said second user, and calculates $E=h(B_2\|T\|E_2')$; and said step (6) comprises the steps:

(6-1) said first user calculates a signature $S_1$ for said amount x to be divided from said electronic cash C by the following equation $$S_1=g(x\|h(B_2\|T\|E_2'))^{d_1} \bmod N_1; \text{ and}$$

sends said signature $S_1$ and said amount x to said second user; and (6-2) said second user makes a check to see if said amount x is smaller than the maximum amount X of said electronic cash C;

when this check does not pass, halts subsequent processing;

when said check passes, verifies the validity of said signature $S_1$ by checking whether said $S_1$ satisfies the following equation $$S_1^{e_1} \equiv g(x\|E) \pmod{N_1}; \text{ and}$$

when this check passes, said second user regards the transferring of the amount worth said amount x from said first user as being valid and receives it.

15. The method of claim 14, further comprising the steps:

(7) said second user sends to a shop said second license $(B_2,I_2,N_2)$ and a history $H_1$ $(I_1,B_1,N_1,B_1,b,C,x,T,E_2',S_1)$ of communications conducted with said first user when electronic cash was transferred;

(8) said shop:

verifies the validity of said signature $B_2$ of said second user for $(I_2,N_2)$ by checking whether said $B_2$ satisfies the following equation $$B_2^{e_B} \equiv g(N_2\|I_2) \pmod{n_B};$$

and verifies the validity of said communication history $H_1$;

when either one of these checks does not pass, halts subsequent processing;

when said checks both pass, generates a random value E' and sends it to said second user together with identification information $ID_V'$ and a time stamp T' and calculates $$E_V=H(ID_V\|T'\|E_V');$$

(9) said second user:

generates a signature $S_2$ for an amount y to be divided from said transferred amount x for spending, by the following equation $$S_2=g(y\|h(ID_V\|T'\|E_V'))^{d_2} \bmod N_2$$

and sends said signature $S_2$ and said amount x to said shop;

(10) said shop:

makes a check to see if said amount y is smaller than the amount x to be divided from said electronic cash C for transferring;

when this verification fails, halts subsequent processing;

when said verification succeeds, verifies the validity of said signature $S_2$ by checking whether said $S_2$ satisfies the following equation $$S_2^{e_2} \equiv g(y\|E_V) \pmod{N_2};$$

when this verification succeeds, regards the payment of the amount worth y and receives it from said second user.

16. The method of claim 10, wherein:

in said step (1), said user:

generates two large prime numbers P and Q;

uses said prime numbers to calculate a composite number $N=P^2 \times Q$ as said anonymous public key;

stores d and N in a memory; and transmits N to a trustee;

in step (2), said trustee:

keeps the correspondence of said user and said N as said correspondence table in secrecy;

generates information I on the term of validity or the like;
calculates the following equation $$B \equiv g(N\|I)^{d_B} \bmod n_B$$

through use of a secret key $(d_B, n_B)$ for signature of said trustee; and
transmits said B and said information I to said user;
in said step (3), said user:
(3-1) stores information (B,I,N) from said trustee as a license in a memory;
(3-2) said bank responds to a request of said user for withdrawal of said electronic cash to generate a random value r, calculates the following equation $$a' = r^{L_C} \bmod n_C$$

and transmits it to said user;
(3-3) said user generates random value r' and b, calculates the following equation $$a = a' r'^{L_C} h c^b \bmod n_C$$

and stores it in a memory, calculates the following equation $$c = g(B\|a) \bmod n_C$$

and stores it in a memory, and calculates the following equation $$c' = c + b \bmod L_C$$

and transmits it to said bank;
in said step (4), said bank:
(4-1) calculates the following equation $$y' = rx_C^{c'} \bmod n_C$$

through the use of a public key $(h_C, L_C, n_C)$ corresponding to the face value of said electronic cash and a secret key $x_C$, transmits it to said user, and at the same time, withdraws the amount concerned from the account of said user, or receives said amount from said user by some other means; and
(4-2) said user calculates d which satisfies the following equation $$c' = c + b + dL$$

and calculates the following equation $$y = y' r' h^{-d} \bmod n_C$$

and stores it in a memory together with a and c in the form of electronic cash C=(a,c,y).
17. The method of claim 11, wherein: said step (5) comprises the steps:
(5-1) said user sends I, N, B, C to said shop;
(5-2) said shop verifies the validity of a signature B for (I,N) by checking whether said B satisfies the following equation $$B^{e_B} \equiv g(N\|I) \pmod{n_B}$$

through the use of a public key $(e_B, n_B)$ for signature of said trustee and verifies the validity of said electronic cash for said signature B by checking whether said C satisfies the following equation $$y^{L_C} \equiv ah^C \pmod{n_C}$$

$$c = g(B\|a)$$

when this verification fails, halts subsequent processing;
when this verification succeeds, said shop generates a random value E' and sends it to said user together with identification information $ID_V$ and a time stamp T and calculates $E = h(ID_V\|T\|E')$ by using a one-way function h; and
(5-3) said user:
determines that he spends an amount x in said electronic cash C, calculates the following equation $$m = x\|h(ID_V\|T\|E')$$

and generates an ESIGN signature S by the following equation $$S = E_{SIG}(m, p, q)$$

through the use of a secret key (p,q) of said user and sends said amount x and said signature S to said shop; and
said step (6) comprises the steps:
(6-1) said shop makes a check to see if said amount x is smaller than the maximum amount x of said electronic cash C;
when this check fails, halts subsequent processing;
when the check passes, verifies the validity of said ESIGN signature S by the following equation $$E_{VER}(m, S, N) = OK/NG$$

through the use of said pieces of information m, S and N; and
when this verification succeeds, said shop regards the payment of an amount worth said x as being valid and receives it from said user.
18. The method of claim 17, further comprising the steps:
(7) said shop presents to said bank a history H of communication conducted with said user for the spending of said electronic cash;
(8) said bank verifies the validity of said communication history H and, when this verification succeeds, stores the history H and pays an amount concerned into an account of said shop, or pays said amount to said shop by some other means;
(9) said bank places said history H under its supervision to prevent said electronic cash C from being spent in excess of the maximum amount X and, if said cash C is spent in excess of the maximum amount X, presents a history of all payments by said electronic cash C as evidence of an attack; and
(10) said trustee finds out said user's name from said correspondence table on the basis of said N contained in said communication history H and identifies the attacker.
19. The method of claim 1, wherein said trustee is composed of a plurality of institutions, and said step (2) is a step of storing the correspondence of said user identification information $ID_U$ and said anonymous public key N as information distibuted among said plurality of institutions.
20. The method of claim 19, wherein in said step (2), said plurality of institutions store the correspondence of said user identification information $ID_U$ and said anonymous public key N in a sequentially corresponding manner by different pairs of sequentially associated pieces of information so that only when said plurality of institutions cooperate, the correspondence of said anonymous public key N and said identification information $ID_U$ can be detected from said associated pieces of information.

21. The method of claim 20, wherein said plurality of institutions are t institutions $40T_1$ to $40T_t$, and said step (1) comprises the steps:

(1-1) wherein said user generates keys $k_1$ to $k_t$ in a one-to-one correspondence with said t institutions $40T_1$ to $40T_t$ when said user registers said anonymous public key N with said t institutions;

(1-2) wherein said user uses a public key cryptography function $E_i$ of each institution $40T_i$ to recursively calculate $\phi = E_i(k_i \| \phi_{i-1})$ for $1 \leq i \leq 1$ to ultimately obtain $\phi_t$, $\phi_0$ being the identification information $ID_U$ of said user; and (1-3) wherein said user recursively calculates $\Phi_1 = E_1 o \ldots o E_t(N\|\phi_t)$, where $E_i o E_j(x)$ represents $E_i(E_j(x))$, said $\Phi_1$ being transmitted to said first institution $40T_1$; and said step (2) comprises the steps:

(2-1) said first institution uses a public key decryption function $D_1$ to calculate $\Phi_1 = D_1(\Phi_1)$ and transmits it to said second institution $40T_2$, and for i=1, . . . t−1, said each institution $40T_i$ uses the public key decryption function $D_i$ to calculate $\Phi_{i+1} = D_i(\Phi_i)$ and transmits it to said institution $40T_{i+1}$ so that said institution $40T_t$ ultimately obtain $\Phi_t$;

(2-2) said institution $40T_t$ uses said public key decryption function $D_t$ to calculate $(N\|\phi_t) = D_t(\Phi_t)$ from $\Phi_t$ and $(k_t\|\phi_{t-1}) = D_t(\phi_t)$ from $\phi_t$ and finally obtains $(N, \phi_{t-1}, k_t)$;

(2-3) said institution $40T_t$ generates a digital signature for said anonymous public key N, encrypts said digital signature B into $\Psi_t = \epsilon_{kt}(B)$, using $k_t$ as a secret key, stores N, B and $\phi_t$ in a memory and transmits $(\phi_{t-1}, \phi_t)$ to said institution $40T_{t-1}$;

(2-4) wherein said institution $40T_i$ calculates $(k_i\|\phi_{i-1}) = D_i(\phi_i)$ from $\phi_i$, encrypts $\Psi_{i+1}$ into $\Psi_i = e_{ki}(\Psi_{i+1})$ by using $k_i$ as a secret key, then stores a pair of associated pieces of information $(\Psi_i, \Psi_{i+1})$ and transmits $(\phi_{i-1}, \Psi_i)$ to said institution $40T_{i-1}$, this sequence of operations being repeated for i=t−1,t−2, . . . , t so that said institution $40T_t$ ultimately obtains $(\phi_1, \Psi_2)$;

(2-5) wherein said institution $40T_1$ calculates $(k_1\|I\ D_U) = D_1(\phi_1)$ from $\phi_1$, identifies said user on the basis of said identification information $ID_U$, calculates $\Psi_1 = \epsilon_{k1}(\Psi_2)$ from $k_1$ and $\Psi_2$, stores $ID_U$, $\Psi_2$ and $\Psi_1$ in a memory $40M_1$ and transmits $\Psi_1$ to said user; and (2-6) wherein said user obtains said digital signature B from said trustee by the following equation $$B = \delta_{kt} o \ldots o \delta_{k1}(\Phi_1) = g(N)^{dT} \bmod n_T$$

through the use of decryptors for $(k_1, \ldots, k_t)$ and $\epsilon$.

22. The method of claim 1, wherein said trustee is composed of t independent institutions $40T_1$ to $40T_t$, t being an integer equal to or greater than 2, and which further comprises the step wherein, when getting electronic cash issued by said bank, said user generates a random value $\lambda$ corresponding to said electronic cash C and t−1 random values $\lambda_1, \ldots, \lambda_{t-1}$ and calculates $E_1(\lambda(1)), \ldots, E_t(\lambda(t))$ for said t institutions by using public key encryptors $E_1, \ldots, E_t$, where $\lambda(x) = \lambda + \lambda_1 x + \ldots + \lambda_{t-1} x^{t-1} \bmod r$, said $E_1(\lambda(1)), \ldots, E_t(\lambda(t))$ being transmitted to each of said t institutions.

23. The method of claim 22, further comprising the step where, when receiving an official request or permission from a third party, said t institutions cooperates to decrypt said random values $\lambda$ and write them into a database.

24. The method of claim 23, wherein said random value decryption processing comprises processing by which said t institutions respectively extract pieces of secret information $\lambda(1), \ldots, \lambda(t)$ from $E_1(\lambda(1)), \ldots, E_t(\lambda(t))$ by the corresponding public keys and calculate, from said pieces of secret information and a parameter r, $\lambda_1, \ldots, \lambda_{t-1}$ which satisfy the following equation $$\lambda(x) = \lambda + \lambda_1 x + \ldots + \lambda_{t-1} x^{t-1} \bmod r.$$

* * * * *